(12) United States Patent
Uemura et al.

(10) Patent No.: US 10,390,251 B2
(45) Date of Patent: Aug. 20, 2019

(54) TERMINAL DEVICE, BASE STATION DEVICE, MEASUREMENT METHOD, AND INTEGRATED CIRCUIT

(71) Applicant: SHARP KABUSHIKI KAISHA, Sakai, Osaka (JP)

(72) Inventors: Katsunari Uemura, Sakai (JP); Shohei Yamada, Sakai (JP); Hidekazu Tsuboi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/745,814

(22) PCT Filed: Jul. 12, 2016

(86) PCT No.: PCT/JP2016/070600
§ 371 (c)(1),
(2) Date: Jan. 18, 2018

(87) PCT Pub. No.: WO2017/014111
PCT Pub. Date: Jan. 26, 2017

(65) Prior Publication Data
US 2018/0220318 A1    Aug. 2, 2018

(30) Foreign Application Priority Data

Jul. 22, 2015   (JP) .................................. 2015-144725

(51) Int. Cl.
*H04B 17/318* (2015.01)
*H04W 24/10* (2009.01)

(52) U.S. Cl.
CPC .......... *H04W 24/10* (2013.01); *H04B 17/318* (2015.01)

(58) Field of Classification Search
CPC ............................ H04W 24/10; H04B 17/318
(Continued)

(56) References Cited

U.S. PATENT DOCUMENTS 8,537,739 B1 *  9/2013  Dinan ................. H04W 74/006
                                                         370/312
9,674,719 B2 *  6/2017  You ....................... H04L 1/0693
(Continued)

FOREIGN PATENT DOCUMENTS

| EP | 3316639 A1 | 5/2018 |
| WO | 2013/112983 A2 | 8/2013 |
| WO | 2016/182738 A1 | 11/2016 |

OTHER PUBLICATIONS

Consideration on Measurement for LAA; May 25-29, 2015; 3GPP TSG-RAN WG2 Meeting #90 R2-152427; ETRI; Fukuoka, Japan.
(Continued)

*Primary Examiner* — Sonny Trinh
(74) *Attorney, Agent, or Firm* — ScienBiziP, P.C.

(57) ABSTRACT

Provided is a technology related to a terminal device, a base station device, a communication system, a measurement method and an integrated circuit that efficiently perform cell measurement. The base station device configures a primary cell and one or more secondary cells to the terminal device, and indicates a measurement object, a reporting configuration including information indicating a threshold associated with an RSSI report and a report interval, and a measurement identity for linking the reporting configuration and the measurement object, to the terminal device. When, in each configured measurement identity, an associated reporting configuration includes information indicating the threshold associated with the RSSI report and the report interval, the terminal device periodically reports an average value of RSSIs measured in a duration of the report interval, and a percentage of the RSSIs being beyond the threshold as a measurement result.

6 Claims, 13 Drawing Sheets

(58) Field of Classification Search
USPC .................. 455/423, 67.11, 115.1, 115.3
See application file for complete search history.

(56) References Cited

U.S. PATENT DOCUMENTS

| | | | | |
|---|---|---|---|---|
| 2012/0250578 A1* | 10/2012 | Pani | ............... | H04W 48/12 |
| | | | | 370/254 |
| 2015/0358094 A1* | 12/2015 | Yi | ............... | H04B 17/318 |
| | | | | 370/252 |
| 2016/0338118 A1* | 11/2016 | Vajapeyam | ......... | H04B 17/318 |
| 2017/0245205 A1* | 8/2017 | You | ............... | H04L 1/0693 |

OTHER PUBLICATIONS

"3rd Generation Partnership Project; Technical Specification Group Radio Access Network; Study on Licensed-Assisted Access to Unlicensed Spectrum"; 3GPP TR 36.889 V1.0.1 (Jun. 2015).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; 3GPP TS 36.300 V12.5.0 (Mar. 2015).

Qualcomm Incorporated, "Considerations on RRM measurements for LAA-LTE", R2-152708, 3GPP TSG-RAN WG2 Meeting #90bis, Fukuoka, Japan, May 25-29, 2015.

* cited by examiner

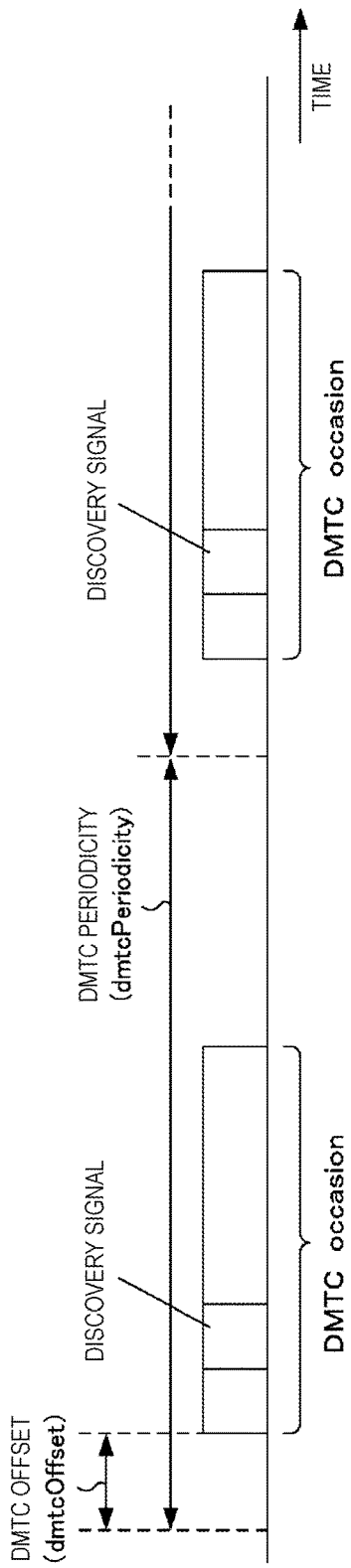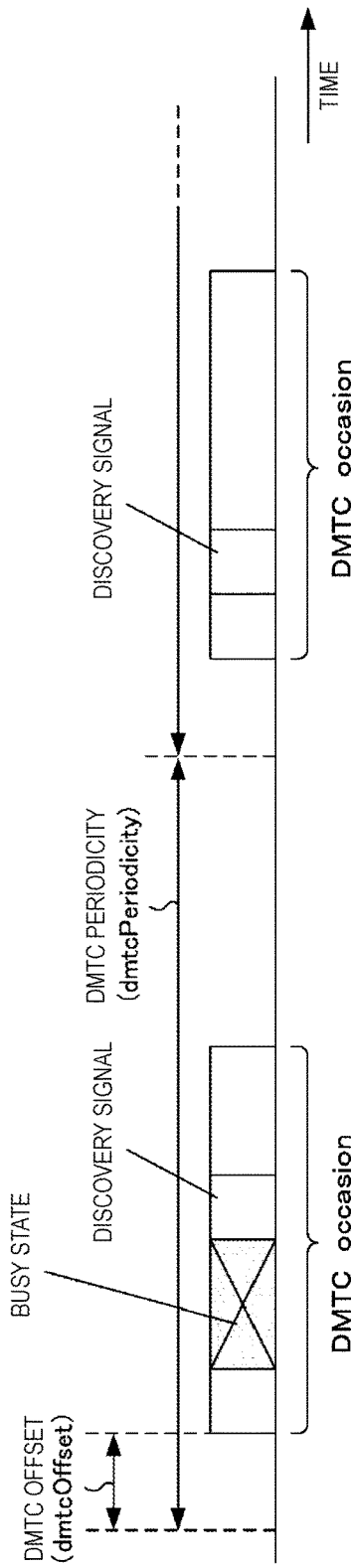

TERMINAL DEVICE, BASE STATION DEVICE, MEASUREMENT METHOD, AND INTEGRATED CIRCUIT

TECHNICAL FIELD

The embodiments of the present invention relate to a technology of a terminal device, a base station device, a communication system, a measurement method and an integrated circuit that efficiently perform cell measurement.

This application claims priority based on JP 2015-144725 filed on Jul. 22, 2015, the contents of which are incorporated herein by reference.

BACKGROUND ART

The 3rd Generation Partnership Project (3GPP), which is a standardization project, has standardized the Evolved Universal Terrestrial Radio Access (EUTRA), in which high-speed communication is realized by adopting an orthogonal frequency division multiplexing (OFDM) communication scheme and flexible scheduling in a unit of prescribed frequency and time called a resource block. EUTRA may be also referred to as Long Term Evolution (LTE).

The 3GPP discusses LTE Advanced (also referred to as LTE-A), which realizes higher-speed data transfer and has compatibility with LTE. According to the LTE Advanced, a technology of simultaneously connecting with multiple cells to perform communication (a carrier aggregation technology or a dual connectivity technology) is described (NPL 1).

NPL 2 discusses Licensed-Assisted Access (LAA). The LAA is a technology that uses a frequency of an unlicensed spectrum used by a radio Local Area Network (LAN) or the like, as LTE in an assisted manner. More specifically, a terminal device and a base station device add a cell (secondary cell) of a frequency in the unlicensed spectrum in addition to a cell (primary cell (described below)) of a frequency in a licensed spectrum by the carrier aggregation technology to perform communication. The frequency of the unlicensed spectrum is, for example, an Industry-Science-Medical (ISM) band.

CITATION LIST

Non Patent Literature

NPL 1: 3GPP TS 36.300 V12.5.0 (2015 March) http://www.3gpp.org/DynaReport/36300.htm
NPL 2: 3GPP TR 36.889 V1.0.1 (2015 June) http://www.3gpp.org/DynaReport/36889.htm

SUMMARY OF INVENTION

Technical Problem

NPL 2 describes measuring magnitude of signal energy (RSSI measurement) for each frequency in order to solve a problem of interference received by a terminal device from a transmission point (a cell or an access point) that is not yet detected by a base station device, i.e., the problem of a hidden node, as it is known. However, NPL 2 neither discloses nor suggests a specific RSSI measurement procedure and a report procedure. Particularly, a measurement method in the related art reports a measurement result for each cell. Therefore, an efficient method of reporting a measurement result (e.g., RSSI) obtained for each frequency has not been considered.

The embodiments of the present invention are provided in light of the above problems, and provide a technology related to a terminal device, a base station device, a communication system, a measurement method and an integrated circuit that can perform efficient measurement.

Solution to Problem

In order to accomplish the object described above, the present invention is contrived to provide the following means. Specifically, a terminal device according to an embodiment of the present invention is configured to configure a primary cell and one or more secondary cells, and when, in each configured measurement identity, an associated reporting configuration includes information indicating a threshold associated with a Received Signal Strength Indicator (RSSI) report and a report interval, periodically report an average value of RSSIs measured in a duration of the report interval, and a percentage of the RSSIs being beyond the threshold as a measurement result.

A base station device according to an embodiment of the present invention is configured to configure a primary cell and one or more secondary cells to a terminal device, and indicate a measurement object, a reporting configuration including information indicating a threshold associated association with a Received Signal Strength Indicator (RSSI) report and a report interval, and a measurement identity for linking the reporting configuration and the measurement object, to the terminal device to cause the terminal device to periodically report an average value of RSSIs of a frequency indicated by the measurement object in a duration of the report interval, and a percentage of the RSSIs being beyond the threshold as a measurement result.

A measurement method of a terminal device according to an embodiment of the present invention includes at least the steps of: configuring a primary cell and one or more secondary cells; and when, in each configured measurement identity, an associated reporting configuration includes information indicating a threshold associated with a Received Signal Strength Indicator (RSSI) report and a report interval, periodically reporting an average value of RSSIs measured in a duration of the report interval, and a percentage of the RSSIs being beyond the threshold as a measurement result.

A measurement method of a base station device according to an embodiment of the present invention includes the steps of: configuring a primary cell and one or more secondary cells to a terminal device; and indicating a measurement object, a reporting configuration including information indicating a threshold associated with a Received Signal Strength Indicator (RSSI) report and a report interval, and a measurement identity for linking the reporting configuration and the measurement object to the terminal device, to cause the terminal device to periodically report an average value of RSSIs of a frequency indicated by the measurement object in a duration of the report interval, and a percentage of the RSSIs being beyond the threshold as a measurement result.

An integrated circuit mounted on a terminal device according to an embodiment of the present invention causes the terminal device to exhibit at least the functions of: configuring a primary cell and one or more secondary cells; and when, in each set measurement identity, an associated reporting configuration includes information indicating a threshold associated with a Received Signal Strength Indicator (RSSI) report and a report interval, periodically reporting an average value of RSSIs measured in a duration of the report interval, and a percentage of the RSSIs being beyond the threshold as a measurement result.

An integrated circuit mounted on a base station device according to an embodiment of the present invention causes the base station device to exhibit at least the functions of: configuring a primary cell and one or more secondary cells to a terminal device; and indicating a measurement object, a reporting configuration including information indicating a threshold associated with a Received Signal Strength Indicator (RSSI) report and a report interval, and a measurement identity for linking the reporting configuration and the measurement object to the terminal device, to cause the terminal device periodically report an average value of RSSIs of a frequency indicated by the measurement object in a duration of the report interval, and a percentage of the RSSIs being beyond the threshold as a measurement result.

The present description discloses embodiments in view of the technology related to a terminal device, a base station device, a communication system, a measurement method, and an integrated circuit that perform efficient measurement, but a communication method applicable to each embodiment is not limited to EUTRA or a communication method compatible with EUTRA such as Advanced EUTRA.

For example, the technology described herein may be used in various communication systems that use a code division multiple access (CDMA), a time division multiple access (TDMA), a frequency division multiple access (FDMA), an orthogonal FDMA (OFDMA), a single career FDMA (SC-FDMA), other access methods and the like. In this description, a system and a network may be used as synonyms.

Advantageous Effects of Invention

According to the embodiments of the present invention, it is possible to provide a technology related to a terminal device, a base station device, a communication system, a measurement method, and an integrated circuit that can perform efficient measurement.

BRIEF DESCRIPTION OF DRAWINGS

FIGS. 13A and 13B are views for describing a discovery signal according to the embodiment of the present invention.

DESCRIPTION OF EMBODIMENTS

Figure 1:
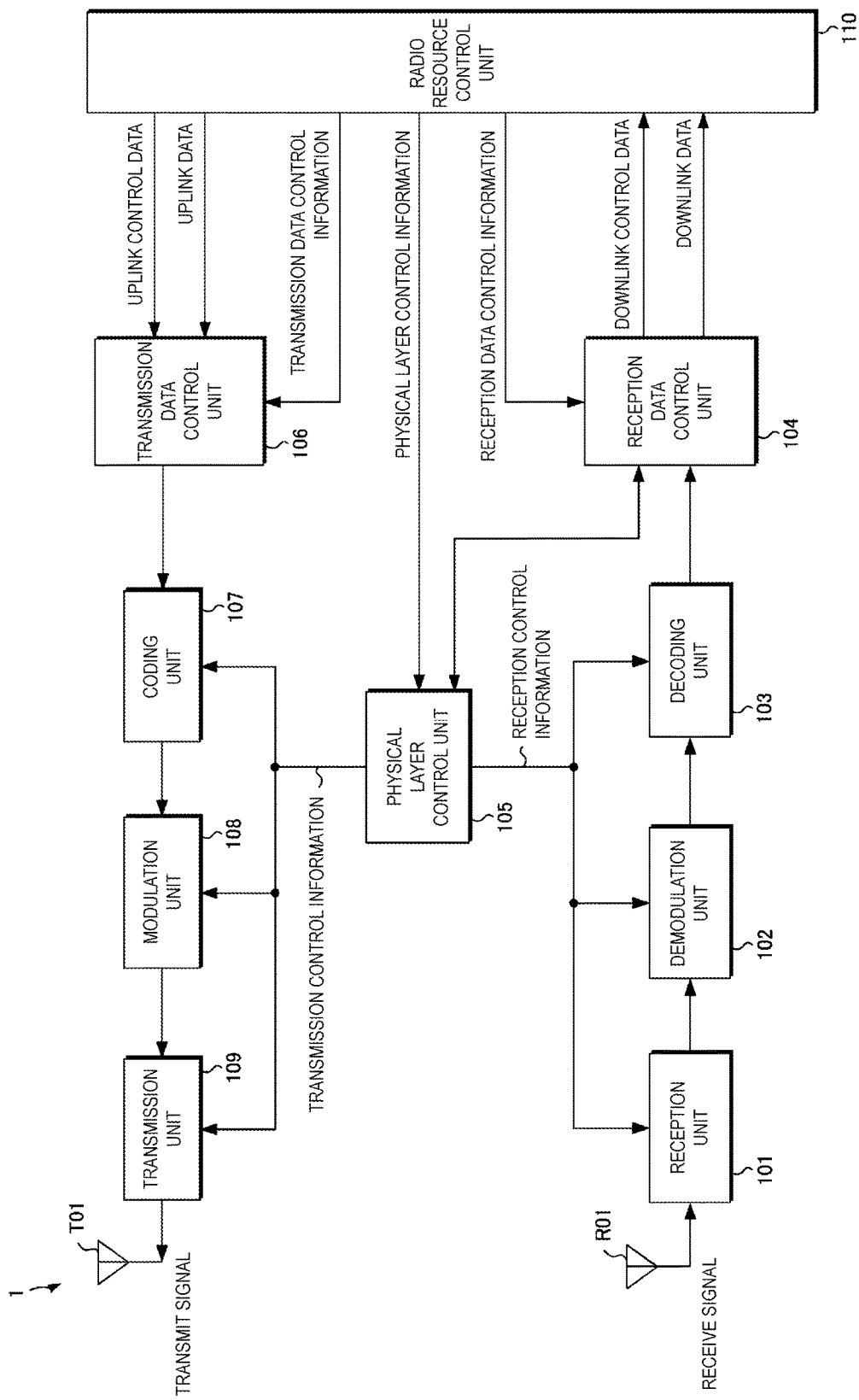
FIG. 1 is a block diagram illustrating an example of a schematic configuration of a terminal device according to an embodiment of the present invention.

A technology related to each embodiment of the present invention will be briefly described below.
Channel/Signal A channel of LTE (EUTRA) includes a logical channel, a transport channel and a physical channel. The channel means a medium used to transmit and receive signals. The logical channel defines a type of data transmission service in which data is transmitted and received in a Medium Access Control (MAC) layer. The transport channel defines characteristics of data transmitted via a radio interface and defines how this data is transmitted.

The physical channel refers to a physical medium that carries data transferred to a physical layer through the transport channel. In embodiments of the present invention, the "physical channel" may be used as a synonym of "signal". In a communication system developed from EUTRA (LTE, LTE-A), a new physical channel may be added, the constitution (configuration) or format of existing physical channel may be changed, or another constitution or format may be added. However, the description of each embodiment of the present invention will not be affected even in a case where such addition or change is performed.

In EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a certain frequency domain constituted of a set of multiple subcarriers (e.g., 12 subcarriers) on a frequency axis and a domain constituted of a certain transmission time slot (one slot).

Downlink in EUTRA will be described. A logical channel in the downlink includes a Broadcast Control Channel BCCH, a Paging Control Channel PCCH, a Common Control Channel CCCH, a Dedicated Control Channel DCCH, and a Dedicated Traffic Channel DTCH.

The Broadcast Control Channel BCCH is a logical channel used to broadcast system information. The Paging Control Channel PCCH is a logical channel used to transmit paging information, and is used when a network pages a terminal device or is used to notify a system information update. The Common Control Channel CCCH is a logical channel used to transmit control information between the terminal device and the network, and is used by the base station device when a state of the terminal device does not transition to a state (an RRC connected state or RRC_CONNECTED) where the network and the radio resource control (RRC) are connected in the downlink.

The Dedicated Control Channel DCCH is a point-to-point bidirectional channel, and is a logical channel used to transmit dedicated control information between the terminal device and the network. The Dedicated Control Channel DCCH may be used between the terminal device in the RRC connected state and the base station device. The Dedicated Traffic Channel DTCH is a point-to-point bidirectional channel, is a channel dedicated to one terminal device, and is a logical channel used to transfer (transmit) user information (unicast data).

The downlink transport channel includes a Broadcast Channel BCH, a Paging Channel PCH, and a Downlink Shared Channel DL-SCH.

The Broadcast Channel BCH is broadcasted to overall cells by a format (transport format) defined in a stationary manner and in advance. The Downlink Shared Channel DL-SCH supports HybridAutomatic Repeat Request (HARQ), Link Adaption control, dynamic or semi-static resource allocation, and Discontinuous Reception (DRX). The Paging Channel PCH supports discontinuous reception broadcasted to overall cells.

The downlink physical channels and physical signals in EUTRA will be described.

Synchronization Signals are constituted by three kinds of primary synchronization signals (PSSs) and secondary synchronization signals (SSSs) constituted by 31 kinds of codes that are interleaved in the frequency region. 504 patterns of cell identifiers (Physical Cell Identities; PCIs) for identifying base station devices, and frame timing for radio synchronization are indicated by the combinations of the primary synchronization signals and the secondary synchronization signals. The terminal device identifies the physical cell ID of a received synchronization signal by cell search.

A downlink reference signal is classified into multiple types according to its use. For example, cell-specific RSs (Cell-specific reference signals, CRS) are pilot signals transmitted with prescribed power from each cell and are downlink reference signals periodically repeated in the frequency domain and the time domain under a prescribed rule. The terminal device can receive the cell-specific RS and thereby measures the reception quality of each cell. The terminal device can also use a cell-specific RS as a reference signal for demodulation of a physical downlink control channel or a physical downlink shared channel transmitted together with a cell-specific RS.

The sequence used for a cell-specific RS is a sequence distinguishable among each of the cells. The cell-specific RS may be transmitted in all downlink subframes from the base station device, or may be transmitted only in downlink subframes designated by the base station device. The terminal device may receive the cell-specific RS in all downlink subframes or may receive the cell-specific RS only in the downlink subframes designated by the base station device.

The downlink reference signal is also used for estimation of downlink channel propagation path variation. A downlink reference signal used for estimation of downlink channel propagation path variation is referred to as "Channel State Information Reference Signal (CSI-RS, CSI reference signal)". The CSI reference signal may not be actually transmitted or may be transmitted with zero power. The CSI-RS for actually transmitting a signal may be referred to as a non-zero power channel state information reference signal CSI-RS (NZP CSI-RS). A downlink radio resource used to measure an interference component may be referred to as channel state information-interference measurement resource (CSI-IMR) or a CSI-IM resource.

A downlink reference signal individually configured for the terminal device is referred to as UE specific Reference Signals (URS) or a Demodulation Reference Signal (DMRS), and is referred to for a channel propagation path compensation process for demodulating a physical downlink control channel, an enhanced physical downlink control channel or a physical downlink shared channel.

A Physical Broadcast Channel (PBCH) is transmitted for the purpose of indicating (configuring) a Master information block (MIB) commonly used among the terminal devices within the cell. The base station device indicates (transmits) a master information block message including the MIB through the physical broadcast channel. Information indicated (configured) to the terminal device by the master information block message, i.e., information indicated by the MIB is a downlink frequency bandwidth, a system frame number, configuration information (configuration) of the physical channel (PHICH) related to Hybrid ARQ, and the like.

The base station device uses a (pre-defined) system information block type 1 (SIB1) message whose subframe position and period are statically determined, and a system information message (e.g., system information block type 2 to type n) (n is a natural number) of other types dynamically scheduled in a system information window (SI-window) designated by the system information block type 1 to transmit cell common information other than the master information block to the terminal device.

Herein, the master information block message, the system information block type 1 message and the system information message are layer 3 messages (RRC messages). In this description, the system information (broadcast information) refers to these RRC messages or information (information element) indicated by the master information block and each system information block in some cases.

The system information message is indicated by the use of the physical downlink shared channel in radio resources indicated by the physical downlink control channel, and transmits, in an associated system information window, one of the system information items (system information block type 2 to type n (SIB2 to SIBn (n is a natural number))) classified according to usage.

As system information, a Cell Global Identifier (CGI) that indicates a cell-specific identifier, a Tracking Area Identifier (TAI) for managing a standby area in paging, a random access configuration (shared random access configuration) information, timing adjustment information, shared radio resource configuration information per cell, Neighboring cell list information of the same frequency (a different frequency or a different RAT), and uplink access restriction information are indicated.

A Physical Downlink Control Channel (PDCCH) is transmitted by using several OFDM symbols (e.g., 1 to 4 OFDM symbols) from the start of each subframe. The Enhanced Physical Downlink Control Channel (EPDCCH) is a physical downlink control channel allocated to the OFDM symbols to which the physical downlink shared channel PDSCH is allocated. The PDCCH or EPDCCH is used for notifying each terminal device of radio resource allocation information according to scheduling determined by the base station device, control information indicating an adjustment amount for an increase or decrease in transmit power, and the like. In the following, even when the physical downlink control channel PDCCH alone is described, both physical channels that is the PDCCH and the EPDCCH are included unless otherwise noted.

Before transmitting and receiving a layer 2 message (MAC-CE) and layer 3 message (paging, system information, or the like), the terminal device needs to monitor a physical downlink control channel addressed to the terminal device itself, and receive the physical downlink control channel addressed to the terminal device itself, and thereby acquire, from the physical downlink control channel, radio resource allocation information called an uplink grant in a case of transmission and a downlink grant (also referred to as downlink assignment) in a case of reception. Note that it is also possible to constitute the physical downlink control channel so that the physical downlink control channel is to be transmitted in the dedicated resource block domain allocated to each terminal device by the base station device, instead of transmission through OFDM symbols described above.

A Physical Downlink Shared Channel (PDSCH) is also used to indicate, to the terminal device, downlink data as well as the layer 3 message such as paging or system information. Radio resource allocation information of the physical downlink shared channel is indicated (indicated) by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The broadcast channel BCH is mapped to the physical broadcast channel PBCH. The paging channel PCH and the downlink shared channel DL-SCH are mapped to the physical downlink shared channel PDSCH. The physical downlink control channel PDCCH is used only in the physical channel.

In the downlink, the paging control channel PCCH is mapped on the paging channel PCH. The broadcast control channel BCCH is mapped to the broadcast channel BCH and the downlink shared channel DL-SCH. The common control channel CCCH, the dedicated control channel DCCH and the dedicated traffic channel DTCH are mapped to the downlink shared channel DL-SCH.

Next, the uplink in EUTRA will be described. An uplink logical channel includes a common control channel CCCH, a dedicated control channel DCCH, and a dedicated traffic channel DTCH.

The common control channel CCCH is a logical channel used to transmit control information between the terminal device and the network, and is used by the terminal device when, in the uplink, the state of the terminal device does not transition to a state (RRC connected state or RRC_CONNECTED) where the network and radio resource control (RRC) are connected (i.e., RRC idling state or RRC_IDLE).

The dedicated control channel DCCH is a point-to-point bidirectional channel, and is a logical channel used to transmit individual control information between the terminal device and the network. The dedicated control channel DCCH may be used between the terminal device in the RRC connected state and the base station device. The dedicated traffic channel DTCH is a point-to-point bidirectional channel, is a channel dedicated to one terminal device, and is a logical channel used to transfer user information (unicast data).

The uplink transport channel includes an uplink shared channel UL-SCH and a random access channel RACH.

The uplink shared channel UL-SCH supports Hybrid Automatic Repeat Request (HARQ), dynamic adaptive modulation control, dynamic or semi-static resource allocation, and Discontinuous Transmission (DTX). In the random access channel RACH, limited control information is transmitted.

Physical channels and physical signals in the uplink in EUTRA will be described.

A Physical Uplink Control Channel (PUCCH) is used to perform reception confirmation reply (ACK/NACK; Acknowledgment/Negative Acknowledgment) for downlink data transmitted by using the physical downlink shared channel, downlink channel propagation path (channel state)) information (CSI; Channel State Information), and uplink radio resource allocation request (radio resource request, Scheduling Request (SR)).

The CSI includes a Channel Quality Indicator (CQI), a Precoding Matrix Indicator (PMI), a Precoding Type Indicator (PTI), and a Rank Indicator (RI). Indication may be used as a notation for each Indicator.

The Physical Uplink Shared Channel (PUSCH) mainly transmits uplink data and uplink control data and may also include control data such as CSI and ACK/NACK. Moreover, the physical uplink shared channel is also used by the terminal device to notify the base station device of the uplink control information as a layer 2 message and layer 3 message in addition to uplink data. Radio resource allocation information of the physical uplink shared channel is indicated by a physical downlink control channel, as in a case of downlink.

An Uplink Reference Signal (also referred to as "uplink pilot signal" or "uplink pilot channel") includes a Demodulation ReferenceSignal (DMRS) to be used by the base station device to demodulate the physical uplink control channel PUCCH and/or physical uplink shared channel PUSCH, and a Sounding Reference Signal (SRS) to be mainly used by the base station device to estimate an uplink channel state. Moreover, sounding reference signals are categorized into a periodic sounding reference signal (Periodic SRS), which is transmitted periodically, or an aperiodic sounding reference signal (Aperiodic SRS), which is transmitted when transmission is instructed by the base station device.

A Physical Random Access Channel (PRACH) is a channel used for the notification (configuration) of a preamble sequence and includes a guard time. The preamble sequence is constituted so that the base station device is notified of the information with multiple sequences. For example, when 64 kinds of sequences are available, 6-bit information can be provided to the base station device. A physical random access channel is used by the terminal device as a means for accessing the base station device.

The terminal device uses the physical random access channel to request an uplink radio resource when no physical uplink control channel is configured or to request the base station device for a timing adjustment information (also referred to as Timing Advance (TA)) necessary for matching uplink transmission timing to a reception timing window of the base station device, for example. Moreover, the base station device can request the terminal device to start a random access procedure, by using a physical downlink control channel.

In the uplink, the common control channel CCCH, the dedicated control channel DCCH and the dedicated traffic channel DTCH are mapped on the uplink shared channel UL-SCH.

The uplink shared channel UL-SCH is mapped on the physical uplink shared channel PUSCH. The random access channel RACH is mapped on the physical random access channel PRACH. The physical uplink control channel PUCCH is used only in the physical channel.

Other physical channels or physical signals are not highly relevant to each embodiment of the present invention, and therefore detailed description is omitted. The physical channels or the physical signals for which described description is omitted include a Physical Control Format Indicator CHannel (PCFICH), a physical HARQ indicator channel (PHICH, Physical Hybrid ARQ Indicator CHannel), and a Physical Multicast CHannel (PMCH).

Figure 11:
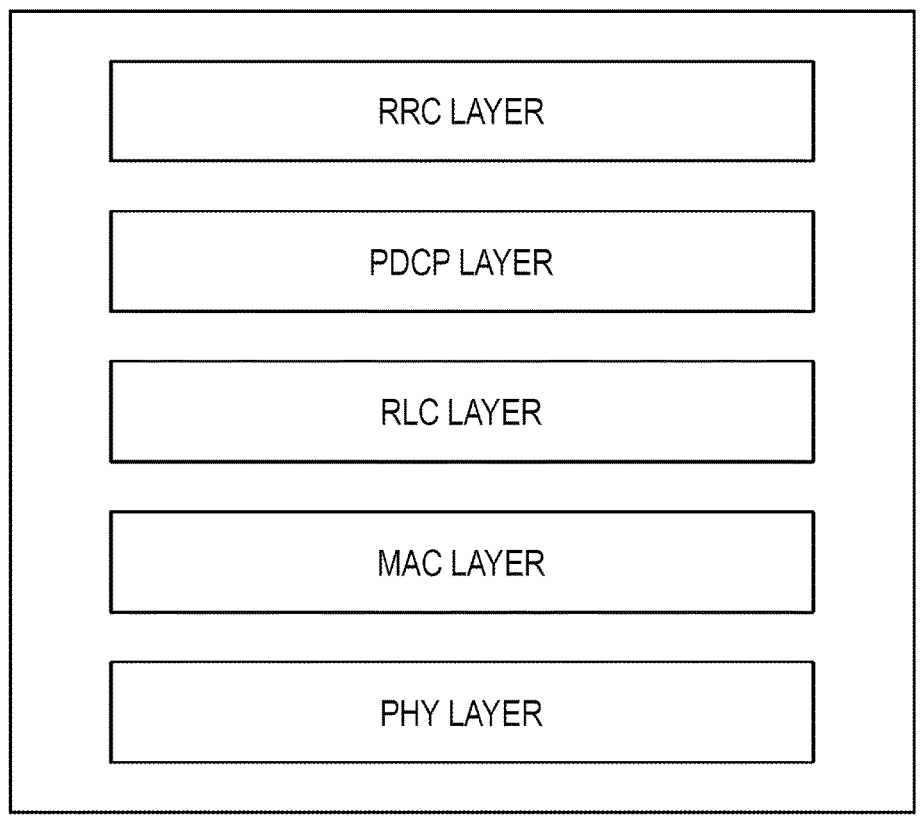
FIG. 11 is a view illustrating a protocol stack that handles control data of the terminal device and the base station device according to the embodiment of the present invention.
Figure 12:
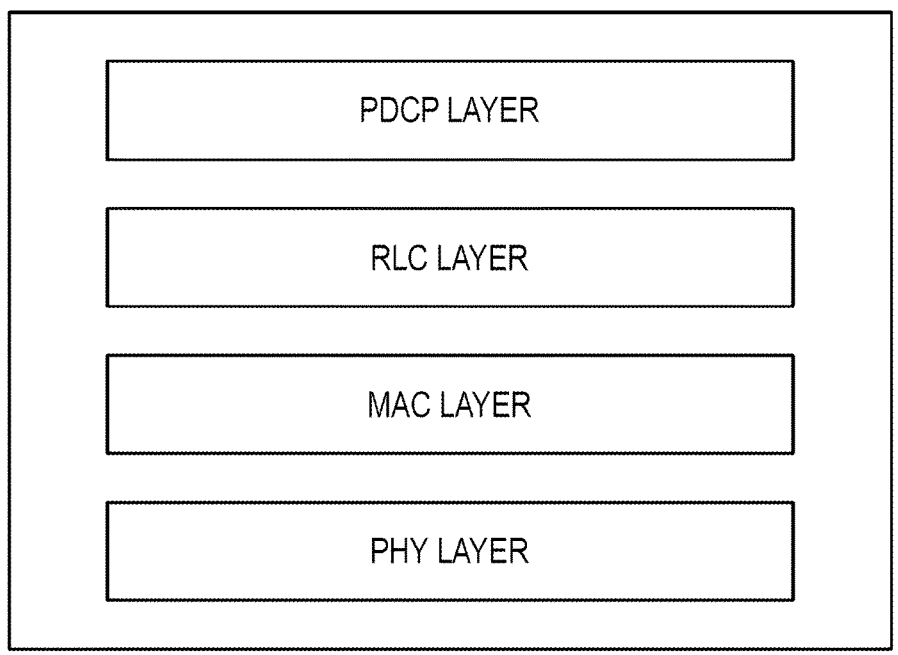
FIG. 12 is a view illustrating a protocol stack that handles user data of the terminal device and the base station device according to the embodiment of the present invention.

A logical channel for Device to Device (D2D) communication between the terminal devices, a transport channel, a physical channel or a physical signal (these are collectively referred to as a sidelink channel) are also used in EUTRA, but the description for the channels and signal is omitted.
Protocol Stack As illustrated in FIG. 11, the protocol stack that handles control data of the terminal device and the base station device is classified into at least a physical (PHY) layer, a MAC layer, an RLC layer, a PDCP layer and an RRC layer. As illustrated in FIG. 12, the protocol stack that handles user data of the terminal device and the base station device is classified into the physical layer (PHY) layer, the MAC layer, the RLC layer and the PDCP layer. The terminal device and/or the base station device include an entity that executes a function/role of each layer in the corresponding layer.

An order of layers in FIGS. 11 and 12 indicates higher levels/lower levels between layers. For example, the RRC layer is a higher layer of the PDCP layer, the RLC layer, the MAC layer and the PHY layer. The MAC layer is a lower layer of the RRC layer, the PDCP layer and the RLC layer, and is a higher layer of the PHY layer.

The Physical layer (PHY layer) provides transmission service to the higher layer by using the Physical Channel. The PHY layer is connected with the Medium Access Control layer (MAC layer) through the transport channel. Data is moved between the MAC layer and the PHY layer via the transport channel. Data is transmitted and received via the physical channel between the physical layers of the terminal device and the base station device.

The MAC layer is connected with the Radio Link Control layer (RLC layer) through the logical channel. The logical channel is distinguished according to a type of information to be transmitted, and is classified into a control channel for transmitting control information and a traffic channel for transmitting user information.

Functions of the MAC layer include mapping between the logical channel and the transport channel, control of the PHY layer for executing discontinuous reception (DRX) and discontinuous transmission (DTX), indication of transmit power information, HARQ (error correction) control, handing of a priority between the terminal devices by dynamic scheduling, handling of a priority of the logical channel, and selection of a transmission format. These functions of the MAC layer are executed by a MAC entity.

Functions of the RLC layer include transfer of data (Protocol Data Unit: PDU) received from the higher layer, an ARQ (error correction) function, Segmentation and Concatenation of RLC data, re-segmentation of the PDU, re-ordering of the PDU order, detection of data duplication, protocol error detection, and discarding of RLC data. These functions of the RLC layer are executed by an RLC entity.

Functions of Packet Data Convergence Protocol layer (PDCP layer) include transfer of user data or control data, header compression for efficiently transmitting IP packets that are the user data in a radio section, management of sequence numbers, encryption and decryption of the user data or the control data, integrity protection of the control data, and detection and discard of data duplication. These functions of the PDCP layer are executed by a PDCP entity.

In the Radio Resource Control layer (RRC layer), only control information is defined. Functions of the RRC layer include broadcast of system information (including NAS common information, a cell selection parameter, neighboring cell information, a common channel configuration, and Earthquake Tsunami Warning System (ETWS)/Commercial Mobile Alert System (CMAS)), and RRC connection control (paging, establishment/change/release of RRC connection, integrity protection configuration, an encryption configuration, mobility control, configuration/change/release of a Radio Bearer (RB), radio configuration control (allocation/change of an ARQ configuration, a HARQ configuration, a DRX configuration or the like), addition/change/release of a secondary cell, QoS control, and recovery from a Radio link failure).

Functions of the RRC layer also include inter-RAT mobility, general protocol error handling, a measurement configuration and report, and storage and report of terminal device log. These functions of the RRC layer are executed by the RRC entity.

RBs include two types of RBs of a Signaling Radio Bearer (SRB) and a Data Radio Bearer (DRB). The SRB is used as a route to transmit the layer 3 message that is control information. The DRB is used as a route to transmit the user information. Each RB is configured (added, changed or released) between the RRC entities of the base station device and the terminal device.

A layer-3 message is a message exchanged between the radio resource control (RRC) entities of the terminal device and the base station device and handled in a protocol for a Control-plane (CP, C-plane) that is exchanged between the radio resource control (RRC) entities of the terminal device and the base station device, and may be used as a synonym of RRC signaling or RRC. A protocol handling user data is referred to as a "User-plane (UP (U-plane))" in contrast to the control plane.
Discovery Signal The base station device may transmit a Discovery Signal (DS) to the terminal device. The discovery signal is also referred to as a Discovery Reference Signal (DRS). The discovery signal may be transmitted on a discovery signal measurement timing configuration occasion (DMTC Occasion) (referred to as a discovery signal transmission occasion below) determined by a Discovery signal measurement timing configuration (DMTC).

The discovery signal on the discovery signal transmission occasion (DMTC Occasion) may be transmitted from the base station device whose downlink transmission has been turned off (downlink transmission is stopped). In other words, the base station device whose downlink transmission has been turned off can transmit only the discovery signal in a measurement duration (i.e., the discovery signal transmission occasion) based on a discovery signal measurement timing configuration, and stop downlink transmission in other durations.

The base station device indicates to the terminal device the discovery signal measurement timing configuration by using RRC signaling. The terminal device to which the discovery signal measurement timing configuration is indicated applies the discovery signal measurement timing configuration to a measurement object frequency to measure. In other words, the terminal device measures the discovery signal in the measurement duration (i.e., discovery signal transmission occasion) based on the discovery signal measurement timing configuration. The terminal device to which the discovery signal measurement timing configuration is indicated may assume that the discovery signal is not transmitted in a subframe other than the discovery signal transmission occasion.

The discovery signal may be constituted of a combination of one or multiple physical signals. For example, the discovery signal may be constituted of the PSS, the SSS, and the CRS. The terminal device may measure the RSRP and the RSRQ by using the CRS that is the discovery signal. Further, the discovery signal may include the CSI-RS, in addition to the PSS, the SSS and the CRS. The terminal device may measure the RSRP and the RSRQ by using the CSI-RS that is the discovery signal.

The number of subframes for the discovery signal transmission occasion (DMTC Occasion) of a certain cell is one to five in Frame structure type 1 (FDD), and two to five in Frame structure type 2 (TDD). The number of subframes is indicated in a discovery signal duration (ds-OccasionDuration), and is indicated by the base station device by RRC signaling. The terminal device may assume that there is a discovery signal transmission occasion once per period (a discovery signal measurement timing configuration periodicity or a DMTC periodicity (dmtcPeriodicity)) configured by the RRC signaling.

Each physical signal may be assumed as follows. The CRS is transmitted via antenna port 0 in downlink time slots (downlink Pilot time slots, DwPTSs) of all downlink subframes and all special subframes (sub frames in which the uplink and the downlink are switched in TDD) in the discovery signal duration. The PSS is transmitted in the first subframe in the discovery signal duration in FDD. Alternatively, the PSS is transmitted in the second subframe in the discovery signal duration in TDD. The SSS is transmitted in the first subframe in the discovery signal duration. The CSI-RS is transmitted in zero or one or more subframes in the discovery signal duration, and is transmitted with non-zero power (i.e., the non-zero power CSI-RS).

FIGS. 13A and 13B are view for describing the discovery signal according to the embodiment of the present invention. FIG. 13A is a view illustrating transmission timings of discovery signals and parameters related to the discovery signals in the related art. The discovery signal transmission occasion (DMTC occasion) exists at an interval of the DMTC periodicity (dmtcPeriodicity). The discovery signal transmission occasion (DMTC occasion) starts at a timing delayed by a DMTC offset (dmtcOffset) from a top frame of the DMTC periodicity (dmtcPeriodicity). The discovery signal (DS) is transmitted during the discovery signal duration (ds-OccasionDuration).

FIG. 13B is a view illustrating transmission timings of discovery signals applied to a non-licensed band, and parameters related to the discovery signals. A relationship among the discovery signal transmission occasion (DMTC occasion), the DMTC periodicity (dmtcPeriodicity) and the DMTC offset (dmtcOffset) is the same as the relationship (FIG. 13A) in the related art. In the non-licensed band (LAA cell), a busy state occurs in which the base station device cannot transmit signals based on LBT. When the busy state occurs during the discovery signal transmission occasion (DMTC occasion), the discovery signal transmission timing shifts to a timing where the busy state is eliminated, as illustrated in FIG. 13B.

In other words, when the busy state is eliminated (based on LBT) during the discovery signal transmission occasion (DMTC occasion), the base station device transmits the discovery signal again during the rest of the discovery signal transmission occasion (DMTC occasion). When the discovery signal cannot be detected at a prescribed timing, the terminal device tries to detect the discovery signal during the rest of the discovery signal transmission occasion (DMTC occasion), taking into account that the discovery signal is not transmitted due to the busy state. In other words, in this case, the terminal device tries to detect the discovery signal at a timing different from a timing in the related art.

Radio Network

A communicable range (communication area) at each frequency controlled by the base station device is assumed to be a cell. Here, the communication area covered by the base station device may be different in size and shape for each frequency. Moreover, the covered area may be different for each frequency. A radio network in which cells having different types of base station devices and different cell radii coexist in the area on the same frequency or different frequencies to form a single communication system, is referred to as "heterogeneous network".

The terminal device operates by assuming the inside of a cell as a communication area. When the terminal device moves from a cell to a different cell, the terminal device moves to an appropriate different cell through a cell reselection procedure at the time of having no radio connection (during no communication) and through a handover procedure at the time of having radio connection (during communication). In general, an appropriate cell is a cell for which it is determined that access from the terminal device is not prohibited based on information specified by the base station device and that has a downlink reception quality satisfying a prescribed condition.

The base station device manages a cell that is an area where terminal devices can communicate with the base station device, for each frequency. A single base station device may manage multiple cells. Cells are classified into multiple types of cells depending on the sizes of the areas (cell size) that allow for communication with terminal devices. For example, cells are classified into macro cells and small cells. The small cell is a cell which generally covers several meters to several tens of meters in radius. Moreover, small cells may be classified into femto cells, pico cells, and nano cells depending on the sizes of the areas.

When a terminal device can communicate with a certain base station device, the cell configured so as to be used for the communication with the terminal device is referred to as a "Serving cell" while the other cells not used for the communication are referred to as a "Neighboring cell", among the cells of the base station device.

Carrier Aggregation

Moreover, the terminal device and the base station device may employ a technique for aggregating the frequencies (component carriers or frequency band) of a plurality of different frequency bands through carrier aggregation and treating the resultant as a single frequency (frequency band). According to carrier aggregation, a component carrier includes an uplink component carrier corresponding to the uplink and a downlink component carrier corresponding to the downlink. In this description, "frequency" and "frequency band" may be used as synonyms.

For example, when five component carriers each having a frequency bandwidth of 20 MHz are aggregated through carrier aggregation, a terminal device capable of carrier aggregation performs transmission and reception by assuming that the aggregated carriers have a frequency bandwidth of 100 MHz. Note that component carriers to be aggregated may have contiguous frequencies or frequencies some or all of which are discontiguous. For example, assuming that available frequency bands are a band of 800 MHz, a band of 2 GHz, and a band of 3.5 GHz, a component carrier may be transmitted in a band of 800 MHz, another component carrier may be transmitted in a band of 2 GHz, and yet another component carrier may be transmitted in a band of 3.5 GHz.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferably equal to any of the frequency bandwidths of cells in the related art in consideration of compatibility but may be a frequency bandwidth different from any of the frequency bands of cells in the related art.

Note that the number of uplink component carriers to be allocated to (configured for or added for) the terminal device by the base station device is preferably the same as or fewer than the number of downlink component carriers.

The terminal device and the base station device manage a cell constituted by an uplink component carrier and a downlink component carrier having a cell-specific connection with the uplink component carrier as a Primary cell (PCell). The terminal device and the base station device manage a cell constituted of component carriers other than those of the primary cell as a Secondary cell (SCell). The frequency of the primary cell is referred to as a "primary frequency", and the frequency of the secondary cell is referred to as a "secondary frequency".

The terminal device receives a paging message, detects update of broadcast information, carries out an initial access procedure, configures security information, and the like in a primary cell, and need not perform these operations in secondary cells. The primary cell and secondary cell are collectively referred to as a "serving cell".

According to carrier aggregation, one or multiple LAA cells may be aggregated. In this case, the LAA cells are preferably added as secondary cells.

The primary cell is not a target of Activation and Deactivation control (in other words, considered as being activated at any time). In addition, the secondary cell has a cell state, activation and deactivation, according to an activity. Regarding the cell state, a state (activation state) where the cell is activated is referred to as an "Activated state" (activate state) and a state (deactivation state) where the cell is deactivated is also referred to as a "Deactivated state" (deactivate state).

For the cell (secondary cell) state, in some cases, change of the state is explicitly designated (indicated or instructed) from the base station device, and the state is changed based on timer information (secondary cell deactivation timer, deactivation time) that is timed by the terminal device per component carrier (secondary cell).

Carrier aggregation is communication using multiple component carriers (frequency bands) by multiple cells and is also referred to as "cell aggregation." The terminal device may have radio connection with the base station device via a relay station device (or repeater) for each frequency. In other words, the base station device of each embodiment of the present invention may be replaced with a relay station device.

LAA

An unlicensed spectrum is referred to as an "unlicensed band" or a "non-licensed band". A cell that uses the frequency of the non-licensed band and is configured as a supplemental resource to a cell of a frequency of the licensed band is referred to as a "LAA cell". The frequency used by the LAA cell may be shared by other communication systems and/or other operators. When the frequency of the LAA cell is shared, fairness with the other communication systems and/or the other operators needs to be taken into account. In other words, a fair frequency sharing technology (method) is preferably applied to communication with the LAA cell.

An example of the fair frequency sharing technology is Listen-Before-Talk (LBT). According to the LBT, before transmitting signals at a frequency of the non-licensed band, a certain base station device or terminal device measures (detects) power in the frequency (an interference signal, reception power, a receive signal, noise power and a noise signal) or the like to identify (detect, assume or determine) whether the frequency is in idle (idle state) or busy (occupied state). A section in which the frequency is idle is also referred to as a "silent period".

When identifying, based on LBT, that the frequency is in idle, the base station device or the terminal device can transmit a signal at a prescribed timing in the corresponding LAA cell. When identifying, based on LBT, that the frequency is busy, the base station device or the terminal device needs to avoid transmission of a signal at a prescribed timing in the corresponding LAA cell. Thus, by using LBT, it is possible to perform control of suppressing an interference with signals transmitted from other base station devices and/or terminal devices including other communication systems and/or other LTE operators.

An LBT procedure is defined as a mechanism that applies clear channel assessment (CAA) before a certain base station device or terminal device uses the frequency (channel). The CCA refers to detection of signal energy (presence/absence of a signal) by using an appropriate threshold level at the frequency to identify whether the frequency is in idle or busy at a transmission timing. Note that, in the present embodiment, the definition of the CCA may be substantially the same as the definition of LBT.

According to CCA, various methods can be used for a method of detecting the presence/absence of other signals. CCA may be executed based on whether, for example, interference power at a certain frequency exceeds a certain threshold. CCA may be executed based on whether, for example, reception power (signal strength) of a prescribed signal or channel at a certain frequency exceeds a certain threshold. The threshold may be determined in advance, may be indicated to the terminal device by system information or an individual radio resource control message from the base station device, or may be indicated to the base station device from a higher radio station device (e.g., MME entity).

For example, the terminal device or the base station device may execute CCA by measuring a Received Signal Strength Indicator (RSSI) of the frequency. The RSSI is total reception power including power from a serving cell of the same channel and neighboring cells, interference power from neighbor channels, and thermal noise power, and is an index indicating signal strength (reception strength).

The LAA cell may be defined as a cell different from a secondary cell in the related art in the licensed band. For example, a configuration of the LAA cell different from the secondary cell that uses the licensed band may be indicated. The LAA cell may be defined as one aspect of the secondary cell. The secondary cell in the related art is also referred to as a "first secondary cell", and the LAA cell is also referred to as a "second secondary cell". The primary cell and the secondary cell in the related art are also referred to as "first serving cells", and the LAA cell is also referred to as a "second serving cell".

The non-licensed band is a frequency different from the licensed band allocated as a dedicated frequency to a prescribed operator. For example, the non-licensed band is a frequency of a frequency band that is freely available for a non-operator in a wireless LAN or the like. For example, the non-licensed band is a frequency that is not configured in dual connectivity or stand alone. In other words, the frequency of the non-licensed band is a frequency that cannot be configured to the primary cell (or a primary secondary cell), and is a frequency that can be configured only to the secondary cell.

With advances in technology, the frequency configured to the LAA cell is not limited only to the non-licensed band, but the frequency may be configured in dual connectivity or stand alone. In other words, in future, the frequency of the non-licensed band may be used for the primary cell (or the primary secondary cell).

The LAA cell may be a cell that uses a scheme different from a scheme in the related art in relation to a constitution of a radio frame, a physical signal and/or a physical channel in LTE, an L1 procedure and an L3 procedure (an RRC procedure, a measurement method), and the like.

For example, in the LAA cell, part of a prescribed signal and/or channel configured (transmitted) to the primary cell and/or secondary cells in the related art may not be configured (transmitted). The prescribed signal and/or channel includes a CRS, a DS, a PDCCH, an EPDCCH, a PDSCH, a PSS, a SSS, a PBCH, a PHICH, a PCFICH, and a CSI-RS.

For example, the signals and/or channels not configured in the LAA cell are as follows. The signals and/or channels described below may be used in combination. In the present embodiment, the signal and/or channel not configured in the LAA cell may be read as a signal and/or channel that is not expected by a terminal to be transmitted from the LAA cell.

(1) In the LAA cell, control information of the physical layer may not be transmitted on the PDCCH, and may be transmitted only on the EPDCCH.

(2) In the LAA cell, the CRS, the DMRS, the URS, the PDCCH, the EPDCCH and/or the PDSCH may not be transmitted in all subframes, and the terminal device may not assume the transmission in all subframes.

(3) In the LAA cell, the terminal device assumes transmission of the DRS, the PSS and/or the SSS in a designated subframe section.

For example, in the LAA cell, only a downlink component carrier or a subframe is defined, and only the downlink signal and/or channel is transmitted. In other words, in the LAA cell, an uplink component carrier or subframe is not defined, and the uplink signal and/or channel is not transmitted.

Measurement

A measurement result measured in the physical layer includes Reference Signal Received Power (RSRP), a Received Signal Strength Indicator (RSSI), and Reference Signal Received Quality (RSRQ).

The RSRP is defined as reception power of a downlink reference signal. The RSRQ is defined as reception quality of the downlink reference signal. The RSRQ is defined as a ratio of the RSRP and the RSSI, and is calculated according to a calculation formula N×RSRQ/RSSI. N represents the number of resource blocks corresponding to a measurement bandwidth of the RSSI, and a numerator and a denominator of the RSRQ are constituted of a set of the same number of resource blocks.

The RSSI in ETURA (E-UTRA carrier RSSI) is constituted of a value obtained by averaging (linearly averaging) total reception power observed only from one or multiple OFDM symbols in one or multiple measurement subframes. In other words, the RSSI is a value obtained by linearly averaging total reception power of OFDM symbols including a CRS of antenna port 0 (a radio resource mapped on antenna port 0). The RSSI is measured in the measurement bandwidth of the N resource blocks. When the higher layer indicates (instructs or configures) that RSRQ measurement is to be performed by using all OFDM symbols, the RSSI is measured by using all OFDM symbols (OFDM symbols including the CRS and OFDM symbols not including the CRS).

Next, a measurement control method (a measurement method and a measurement process) in the terminal device will be described. The base station device indicates, to the terminal device, a Measurement configuration by using a radio resource control connection reconfiguration (RRConnectionReconfiguration) message that is an RRC message.

The terminal device configures a measurement parameter (information element) included in the received measurement configuration, and performs measurement, event evaluation of a measurement event, and measurement reporting for the serving cell and neighboring cells (listed cells) and/or a detected cell according to the indicated measurement parameter. The listed cells are cells indicated as a neighboring cell list included in a Measurement object(s). The detected cell is a cell (a cell detected by the terminal device itself) that is detected by the terminal device at a frequency indicated by the measurement object and is not listed as the measurement object.

The measurement includes intra-frequency measurements, inter-frequency measurements, and inter-RAT measurements. The intra-frequency measurements are measurements performed at a downlink frequency in a serving cell. The inter-frequency measurements are measurements performed at a frequency different from the downlink frequency in the serving cell. The inter-RAT measurements are measurements performed by a Radio Access Technology (RAT) different from a radio technology (e.g., EUTRA) in the serving cell.

The measurement configuration includes, as measurement parameters, a measurement identity (measId), a measurement object(s), a Reporting configuration(s), a quantity configuration (quantityConfig), a measurement gap configuration (measGapConfig), a serving cell quality threshold (s-Measure), and RSRQ measurement on all symbols (measRSRQ-OnAllSymbols).

When an associated measurement object is one in EUTRA, the quantity configuration (quantityConfig) designates a layer 3 filtering coefficient (L3 filtering coefficient). The layer 3 filtering coefficient (L3 filtering coefficient) configures a filtering ratio (rate) of the latest measurement result and a past measurement result. The filtering result is used by the terminal device to perform the event evaluation. The event evaluation indicates decision performed by the terminal device, and related to whether measurement event triggering criteria indicated by the reporting configuration is satisfied. The layer 3 filtering coefficient is individually indicated for each quantity (i.e., for each RSRP, RSRQ and RSSI) to be measured.

When the RSRQ measurement on all symbols (measRSRQ-OnAllSymbols) is configured, the terminal device measures the RSRQ in all OFDM symbols. In other words, during RSSI measurement for calculating the RSRQ, the RSSI is measured by using all OFDM symbols.

The measurement identity (measId) is used to link (associate) the measurement object and the reporting configuration. More specifically, during the measurement configuration, the base station device configures the measurement identity (measId), one measurement object identifier (measObjectId) to be linked and one reporting configuration identifier (reportConfigId) to indicate to the terminal device. In other words, the measurement identity links one measurement object and one reporting configuration. The measurement configuration can make addition, modification and deletion for an association (link) among the measurement identity, the measurement object and the reporting configuration.

The measurement object is configured for each radio access technology (RAT) (e.g. UTRA-FDD, UTRA-TDD, GERAN and cdma2000) or for each frequency. The reporting configuration includes a configuration with respect to EUTRA, and a configuration with respect to RAT other than EUTRA.

The measurement object includes measurement object EUTRA (measObjectEUTRA) associated with the measurement object identifier. The measurement object identifier is an identifier used to identify the measurement object configuration. As described above, the measurement object configuration is configured for each radio access technology (RAT) or for each frequency. The measurement object EUTRA that is a measurement object of EUTRA configures an associated EUTRA frequency, and information applied to a cell of the EUTRA frequency. The measurement object EUTRA of a different frequency is handled as a different measurement object, and is allocated a different measurement object identifier.

The measurement object EUTRA (measObjectEUTRA) may include a carrier frequency (carrierFreq), an allowed measurement bandwidth (AllowedMeasBandwidth), an offset frequency (offsetFreq), information on a neighbouring cell list, information on a black list, and wideband RSRQ measurement (widebandRSRQ-Meas). The measurement object EUTRA may include parameters other than these.

Next, information included in the measurement object EUTRA will be described. The carrier frequency of EUTRA indicates a measurement object frequency. The allowed measurement bandwidth (AllowedMeasBandwidth) indicates a maximum allowed measurement bandwidth when the RSRP and the RSRQ are measured at the measurement object carrier frequency, and is represented by the number of resource blocks. The offset frequency (offsetFreq) indicates an offset value applied to the measurement object frequency.

The wideband RSRQ measurement (widebandRSRQ-Meas) is configured when the allowed measurement bandwidth (AllowedMeasBandwidth) is 50 resource blocks (i.e., 10 MHz) or more. The wideband RSRQ measurement is indicated as a true/false value. In a case of true, the terminal device is requested to perform RSRQ measurement in a wider bandwidth than six resource blocks that is a minimum value of the allowed measurement bandwidth. In other words, in this case, the measurement device measures the RSSI in the wider bandwidth than the six resource blocks.

The measurement object EUTRA can include a discovery signal measurement configuration (measDS-Config). The discovery signal measurement configuration (measDS-Config) can further include configuration information on CSI-RS resource measurement (a CSI-RS resource measurement configuration (MeasCSI-RS-Config)), and a discovery signal measurement timing configuration. Multiple CSI-RS resource measurement configurations can be configured for each CSI-RS resource. The CSI-RS resource indicates a resource element by which the CSI-RS is transmitted.

Hereinafter, the measurement object EUTRA or a measurement object associated with a RAT other than EUTRA may be referred to simply as a measurement object and described.

The discovery signal measurement timing configuration is constituted of information indicating a periodicity of the discovery signal transmission occasion (DMTC occasion) and a time offset (a discovery signal measurement timing configuration periodicity offset or a DMTC periodicity offset (dmtcPeriodOffset), and information indicating a duration of the discovery signal transmission occasion (discovery signal duration (ds-OccasionDuration)). The first subframe in the discovery signal transmission occasion occurs in a system frame number and a subframe number of the primary cell matching with the condition.

dmtcPeriodOffset indicates a DMTC time periodicity (DMTC periodicity (dmtcPeriodicity)), and an intra-DMTC periodicity time offset (DMTC offset (dmtcOffset)). dmtcPeriodOffset is preferably configured for each carrier frequency. A value of the DMTC periodicity (dmtcPeriodicity) indicates a time such as 40 ms, 80 ms or 160 ms. The DMTC offset (dmtcOffset) is given by the number of subframes less than the DMTC periodicity. When, for example, the DMTC periodicity is 40 ms, the DMTC offset is indicated by a value of one of 0 to 39 subframes.

In this case, the terminal device calculates
a system frame number (SFN) of the discovery signal transmission occasion (DMTC occasion) by using Equation (1) defined by $$SFN \bmod T = FLOOR(dmtcOffset/10)$$

The terminal device calculates each subframe number by using Equation (2) defined by $$subframe = dmtcOffset \bmod 10.$$

A value T in Equation (2) is defined by Equation (3) below.

$$T = dmtcPeriodicity/10$$

When the terminal device supports CRS-based discovery signal measurement, the terminal device applies DMTC to measurement of each secondary cell in a deactivated state according to the discovery signal measurement configuration (measDS-Config). The terminal device applies DMTC to measurement of neighboring cells of a frequency of each secondary cell in the deactivated state according to the discovery signal measurement configuration (measDS-Config). DMTC is preferably applied when DMTC is configured in a measurement object (measObject) associated with the frequency of the secondary cell.

When the discovery signal measurement configuration (measDS-config) is configured to the associated measurement object (measObject) and the terminal device supports CSI-RS-based discovery signal measurement, and an event (event C1 or an event C2) related to the CSI-RS report is configured to an event identifier (eventId) of the associated reporting configuration (reportConfig), the terminal device applies DMTC to measurement of CSI-RS resources on the frequency indicated by the associated measurement object (measObject) according to the discovery signal measurement configuration (measDS-Config). In this regard, DMTC is preferably applied according to the discovery signal measurement configuration (measDS-Config) in the associated measurement object (measObject).

When the discovery signal measurement configuration (measDS-config) is configured to the associated measurement object (measObject) and the terminal device supports CSI-RS-based discovery signal measurement, and the associated reporting configuration (reportConfig) includes measurement parameters (e.g., reportStorongestCSI-RSs) related to a neighbor report of the CSI-RS report, the terminal device applies DMTC to measurement associated with the CSI-RS resources on the frequency indicated by the measurement object (measObject) according to the discovery signal measurement configuration (measDS-Config).

The reporting configuration includes reporting configuration EUTRA (reportConfigEUTRA) associated with a reporting configuration identifier (reportConfigId). Hereinafter, the reporting configuration EUTRA may be referred to simply as a reporting configuration and described.

The reporting configuration identifier (reportCopnfigId) is an identifier used to identify a reporting configuration related to measurement. Reporting configuration EUTRA (reportConfigEURA) that is a reporting configuration of EUTRA configures (determines) triggering criteria of a measurement event reported by a measurement report message of EUTRA.

The reporting configuration EUTRA (reportConfigEUTRA) can include an event identifier (eventId), a trigger quantity (triggerQuantity), a hysteresis, a time to trigger (timeToTrigger), a report quantity (reportQuantity), a maximum number of report cells (maxReportCells), a report interval (reportInterval), and a report amount (reportAmount).

Next, the reporting configuration EUTRA (reportConfigEUTRA) will be described. The event identifier (eventId) is information for selecting criteria related to event triggered reporting. The event triggered reporting indicates that, when cell reception quality (measurement result) contiguously satisfies the triggering criteria of the measurement event described below for the time to trigger, the measurement result is reported to the base station device. A method in which the cell reception quality contiguously satisfies the triggering criteria of the measurement event for the time to trigger and reports the measurement result a certain number of times at a certain interval is referred to as "event triggered periodic reporting".

When it is determined that the cell reception quality contiguously satisfies the triggering criteria of the certain measurement event for the time to trigger, the terminal device may determine that the measurement report is triggered (a measurement report procedure is triggered). In the measurement report procedure, the terminal device initiates a transmission procedure of a measurement report message, and transmits the measurement report message including the measurement result to the base station device. The trigger quantity (triggerQuantity) indicates quantity used to evaluate the triggering criteria of the measurement event, and designates Reference Signal Received Power (RSRP) or Reference Signal Received Quality (RSRQ). In other words, the terminal device uses the quantity designated by the trigger quantity (triggerQuantity) as a measurement result of a downlink reference signal (CRS or CSI-RS), and decides whether the triggering criteria of the measurement event designated by the event identifier (eventId) are satisfied.

As the triggering criteria of the measurement event, event A1 to event A6 described below are used for cells of EUTRA, for example, and there are an entering condition and a leaving condition for each event. When determining that the entering condition of the measurement event designated by the base station device is contiguously satisfied for the time to trigger, the terminal device determines that the measurement report is triggered (the measurement report procedure is triggered), and initiates the measurement report message transmission procedure in the measurement report procedure. Meanwhile, when determining that the leaving condition of the measurement event that satisfies the entering condition is contiguously satisfied for the time to trigger, the terminal device stops the associated measurement report message transmission procedure.

In a case where report on leave (reportOnLeave) is configured to the measurement event, when the entering condition of the measurement event designated by the base station device is satisfied and the leaving condition is satisfied, the terminal device determines that the measurement report is triggered (the measurement report procedure is triggered).

Event $A1$ entering condition: $Ms-\text{Hys}>a1\_\text{Threshold}$

Event $A1$ leaving condition: $Ms+\text{Hys}<a1\_\text{Threshold}$     Event 1

Event $A2$ entering condition: $Ms-\text{Hys}<a2\_\text{Threshold}$

Event $A2$ leaving condition: $Ms+\text{Hys}>a2\_\text{Threshold}$     Event 2

Event $A3$ entering condition: $Mn+Ofn+Ocn-\text{Hys}>Mp+Ofp+Ocp+a3\_\text{Offset}$ Event $A3$ leaving condition: $Mn+Ofn+Ocn+\text{Hys}<Mp+Ofp+Ocp+a3\_\text{Offset}$     Event 3

Event $A4$ entering condition: $Mn+Ofn+Ocn-\text{Hys}>a4\_\text{Threshold}$

Event $A4$ leaving condition: $Mn+Ofn+Ocn+\text{Hys}<a4\_\text{Threshold}$     Event 4

Event $A5$ entering condition 1: $Mp-\text{Hys}<a5\_\text{Threshold1}$

Event $A5$ entering condition 2: $Mn+Ofn+Ocn-\text{Hys}>a5\_\text{Threshold2}$

Event $A5$ leaving condition 1: $Mp+\text{Hys}>a5\_\text{Threshold1}$

Event $A5$ leaving condition 2: $Mn+Ofn+Ocn+\text{Hys}<a5\_\text{Threshold2}$     Event 5

Event $A6$ entering condition: $Mn+Ocn-\text{Hys}>Ms+Ocs+a6\_\text{Offset}$

Event $A6$ leaving condition: $Mn+Ocn+\text{Hys}<Ms+Ocs+a6\_\text{Offset}$     Event 6

In this regard, Ms represents a measurement result of the serving cell (the primary cell or the secondary cell). Mp represents a measurement result of the primary cell. Mn represents a measurement result of a neighboring cell. The terminal device uses the measurement result Ms of the serving cell, the measurement result Mp of the primary cell or the measurement Mn of the neighboring cell to evaluate each event.

Hys represents a hysteresis parameter of a target measurement event. Ofn represents a frequency-specific measurement offset value with respect to frequencies of neighboring cells. Ocn represents a cell-specific offset value with respect to neighboring cells. When Ocn is not configured, the terminal device sets the offset value to 0 (zero).

Ofs represents a frequency-specific offset value with respect to a frequency of a serving cell. Ocs represents a cell-specific measurement offset value with respect to the serving cell.

Ofp represents a frequency-specific offset value with respect to the frequency of the primary cell. Ocp represents a cell-specific offset value with respect to the primary cell.

a1_Threshold represents a threshold parameter applied to event A1. a2_Threshold represents a threshold parameter applied to event A2. a3_Offset represents an offset parameter applied to event A3. a4_Threshold represents a threshold parameter applied to event A4. a5_Threshold1 and a5_Threshold2 represent threshold parameters applied to event A5. a6_Offset represents a threshold parameter applied to event A6.

Similarly, event C1 and event C2 of the CSI-RS resources are used as the triggering criteria of the measurement event, and there are entering conditions and leaving conditions for each event. When determining that the entering condition of the measurement event designated by the base station device is contiguously satisfied for the time to trigger, the terminal device determines that the measurement report is triggered (the measurement report procedure is triggered), and initiates the measurement report message transmission procedure. Meanwhile, when determining that the leaving condition of the measurement event that satisfies the entering condition is contiguously satisfied for the time to trigger, the terminal device stops the associated measurement report message transmission procedure.

Event C1 entering condition: $Mcr+Ocr-Hys>c1\_Threshold$

Event C1 leaving condition: $Mcr+Ocr+Hys<c1\_Threshold$    Event C1

Event C2 entering condition: $Mcr+Ocr-Hys>Mref+Oref+c2\_Offset$

Event C2 leaving condition: $Mcr+Ocr+Hys<Mref+Oref+c2\_Offset$    Event C2

In this regard, Mcr represents a measurement result of the CSI-RS resources (i.e., a measurement result of the CSI-RS received in the designated CSI-RS resources). Mref represents a measurement result of the reference CSI-RS resources (a measurement result of the CSI-RS in the CSI-RS resources designated as reference CSI-RS resources by the base station device).

Hys represents a hysteresis parameter of a target measurement event. Ocr represents a CSI-RS resource-specific measurement offset value. Oref represents a reference CSI-RS resource-specific offset value.

c1_Threshold represents a threshold parameter applied to event C1. c2_Threshold represents a measurement offset value applied to event C2.

Hereinafter, preferred embodiments of the present invention will be described in detail below with reference to the accompanying drawings taking into account the above matters. Note that in the description for the embodiments of the present invention, when it is considered that concrete description of known functions and constitutions related to the embodiments of the present invention makes the gist of the embodiments of the present invention unclear, detailed description for the functions and constitutions are omitted.

First Embodiment

A first embodiment of the present invention will be described below.

FIG. 1 is a block diagram illustrating an example of a terminal device 1 according to the first embodiment of the present invention. The terminal device 1 includes at least a receive antenna unit R01, a reception unit 101, a demodulation unit 102, a decoding unit 103, a reception data control unit 104, a physical layer control unit 105, a transmission data control unit 106, a coding unit 107, a modulation unit 108, a transmission unit 109, a transmit antenna unit T01, and a radio resource control unit 110. "Unit" in the drawings is an element that is also expressed by terms such as section, circuit, constituent device, device, and unit, and realizes a function and each procedure of the terminal device 1.

The radio resource control unit 110 is a block that executes each function of a Radio Resource Control (RRC) layer that executes state control of the terminal device 1, measurement control and report control, control of common control information and individual control information, connection control, mobile control, radio resource control and the like. The reception data control unit 104 and the transmission data control unit 106 are blocks that execute each function in a Medium Access Control (MAC) layer that manages a data link layer, a Radio Link Control (RLC) layer, and a Packet Data Convergence Protocol (PDCP) layer.

The terminal device 1 may be configured to include multiple reception blocks (the reception unit 101, the demodulation unit 102 and the decoding unit 103) that support simultaneous reception of multiple frequencies (frequency bands or frequency bandwidths) or cells by carrier aggregation and/or dual connectivity, and multiple transmission blocks (the coding unit 107, the modulation unit 108 and the transmission unit 109) that support simultaneous transmission of multiple frequencies (frequency bands or frequency bandwidths) or cells. The terminal device 1 may be configured to include the multiple reception data control units 104, physical layer control units 105, transmission data control units 106, and radio resource control units 110.

Regarding a reception process of the terminal device 1, the radio resource control unit 110 inputs reception data control information to the reception data control unit 104. The physical layer control unit 105 receives an input of physical layer control information that is a control parameter for controlling each block. The physical layer control information is information including a parameter configuration necessary for radio communication control of the terminal device 1 constituted of reception control information and transmission control information.

The physical layer control information is configured by a radio connection resource configuration, cell-specific broadcast information, system parameters, or the like transmitted in a dedicated manner from a base station device 2 to the terminal device 1, and is input by the radio resource control unit 110 to the physical layer control unit 105 when necessary. The physical layer control unit 105 appropriately inputs reception control information that is control information related to reception to the reception unit 101, the demodulation unit 102 and the decoding unit 103.

The reception control information includes information such as reception frequency band information, a reception timing related to a physical channel and a physical signal, a multiplexing method and radio resource allocation information as downlink scheduling information. The reception data control information is downlink control information including secondary cell deactivation timer information, Discontinuous Reception (DRX) control information, multicast data reception information, downlink retransmission control information, and the like, and includes control information related to downlink of each of the MAC layer, the RLC layer, and the PDCP layer.

A receive signal is received by the receive antenna unit R01, and is input to the reception unit 101. The reception unit 101 receives signals from the base station device 2 according to a frequency and a frequency band designated by the reception control information. The reception unit 101 may include an RF circuit. The received signal is input to the demodulation unit 102. The demodulation unit 102 demodulates the signal. The demodulation unit 102 inputs the demodulated signal to the decoding unit 103. The decoding unit 103 decodes the input signal, and inputs each decoded data item (downlink data and downlink control data) to the reception data control unit 104. A MAC control element transmitted together with each data item from the base station device 2 is also decoded by the decoding unit 103, and the decoded element is input to the reception data control unit 104.

The reception data control unit 104 performs control of the physical layer control unit 105 based on the received MAC control element, buffering control of each decoded data item and error correction control (HARM) of retransmitted data. Each data item input to the reception data control unit 104 is input (transferred) to the radio resource control unit 110.

Regarding a transmission process of the terminal device 1, the radio resource control unit 110 inputs the transmission data control information to the transmission data control unit 106, and the physical layer control unit 105 receives an input of the physical layer control information that is a control parameter for controlling each block. The physical layer control unit 105 appropriately inputs the transmission control information that is control information related to transmission to the coding unit 107, the modulation unit 108, and the transmission unit 109. The transmission control information includes coding information, modulation information, transmission frequency band information, a transmission timing related to a physical channel and a physical signal, a multiplexing method, and radio resource allocation information as uplink scheduling information.

The transmission data control information is uplink control information including Discontinuous Transmission (DTX) control information, random access configuration information, uplink shared channel information, logical channel priority information, resource request configuration information, cell group information, and uplink retransmission control information. The radio resource control unit 110 may configure multiple pieces of random access configuration information associated with multiple cells to the transmission data control unit 106. The radio resource control unit 110 manages transmission timing adjustment information and a transmission timing timer used to adjust an uplink transmission timing, and manages a state of the uplink transmission timing (a transmission timing adjustment state or a transmission timing non-adjustment state) for each cell (or for each cell group or for each TA group). The transmission timing adjustment information and the transmission timing timer are included in the transmission data control information.

When states of multiple uplink transmission timings need to be managed, the transmission data control unit 106 manages transmission timing adjustment information associated with an uplink transmission timing of each of multiple cells (or a cell group or a TA group). The resource request configuration information includes at least maximum transmission counter configuration information and radio resource request prohibit timer information. The radio resource control unit 110 may configure multiple pieces of resource request configuration information associated with multiple cells to the transmission data control unit 106.

Transmission data (uplink data and uplink control data) generated by the terminal device 1 is input to the transmission data control unit 106 at an arbitrary timing by the radio resource control unit 110. In this case, the transmission data control unit 106 calculates the amount of input transmission data (uplink buffer amount). The transmission data control unit 106 has a function for identifying whether the input transmission data is data on a control plane or data on a user plane.

The transmission data control unit 106 stores the transmission data in the uplink buffer in the transmission data control unit 106 (not illustrated) when the transmission data is input to the transmission data control unit 106. The transmission data control unit 106 determines whether a radio resource necessary to transmit the input transmission data is allocated to the terminal device 1. The transmission data control unit 106 selects one of a radio resource request (scheduling request (SR)) that uses the physical uplink shared channel PUSCH or the physical uplink control channel PUCCH, and a radio resource request that uses a physical random access channel, based on radio resource allocation, and requests the physical layer control unit 105 to perform a control process of transmitting the selected channel.

In other words, when radio resources are already allocated, and the transmission data can be transmitted in the physical uplink shared channel PUSCH, the coding unit 107 obtains from the uplink buffer the transmission data associated with the allocated radio resource according to the instruction of the radio resource control unit 110, codes the transmission data, and inputs the coded transmission data to the modulation unit 108. Alternatively, when the radio resources are not allocated, and a radio resource request can be made in the physical uplink control channel, the coding unit 107 codes control data necessary to transmit the radio resource request on the physical uplink control channel according to the instruction of the radio resource control unit 110, and inputs the coded control data to the modulation unit 108.

Alternatively, when the radio resources are not allocated and the radio resource request cannot be made in the physical uplink control channel, the coding unit 107 instructs the transmission data control unit 106 to initiate a random access procedure. In this case, the coding unit 107 generates a preamble sequence transmitted on the physical random access channel based on the random access configuration information input from the transmission data control unit 106. The coding unit 107 appropriately codes each data item according to the transmission control information, and inputs coded data item to the modulation unit 108.

The modulation unit 108 performs an appropriate modulation process based on a channel structure for transmitting each coded data item. The transmission unit 109 maps each modulated data item to the frequency domain, converts a frequency domain signal into a time domain signal, allocates the signal on a carrier wave of a predetermined frequency, and amplifies power. The transmission unit 109 adjusts an uplink transmission timing according to transmission timing adjustment information for each cell (or for each cell group or for each TA group) input from the radio resource control unit 110. The transmission unit 109 may include an RF circuit. A transmission signal output from the transmission unit 109 is transmitted from the transmit antenna unit T01. The physical uplink shared channel on which the uplink control data is allocated can also include, in addition to user data, for example, a layer 3 message (radio resource control message; RRC message).

FIG. 1 omits illustration of other components of the terminal device 1 and data (control information) transmission routes between the components. However, it is obvious that the terminal device 1 includes multiple blocks that include other functions necessary to operate as the terminal device 1 as components. For example, a higher level of the radio resource control unit 110 includes a NAS layer unit that executes control with a core network, and an application layer unit.

The receive antenna unit R01 or the transmit antenna unit T01 is typically a planar multiband antenna, but may be constituted by employing an arbitrary antenna meeting capability, a shape, and a purpose of the terminal device 1. For example, the receive antenna unit R01 or the transmit antenna unit T01 may be constituted of multiple antenna units or have directivity, or may be integrated. The receive antenna unit R01 or the transmit antenna unit T01 may be constituted of multiple physically different or logically separated antenna ports.

Figure 2:
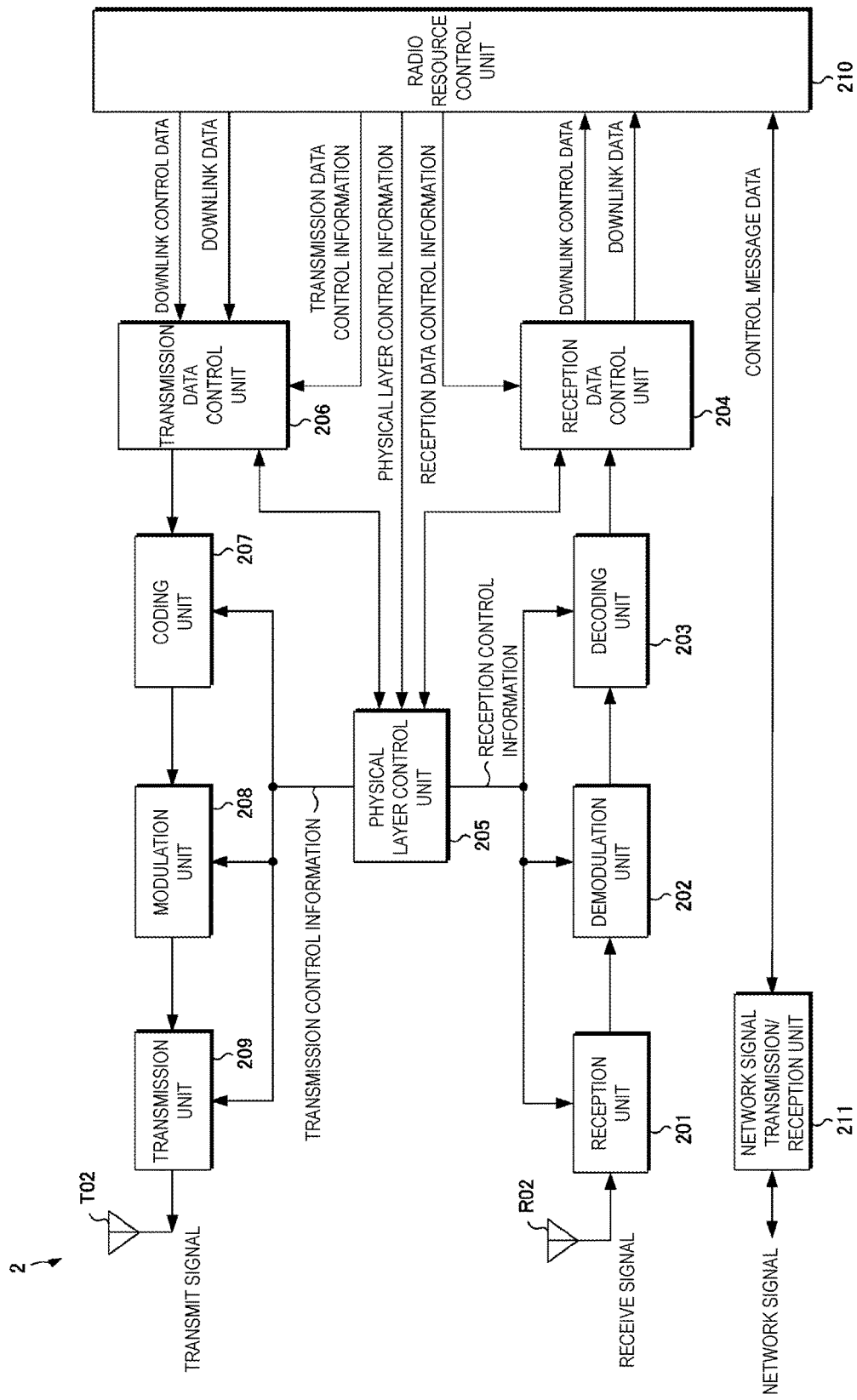
FIG. 2 is a block diagram illustrating an example of a schematic configuration of a base station device according to the embodiment of the present invention.

FIG. 2 is a block diagram illustrating an example of the base station device 2 according to the first embodiment of the present invention. The base station device includes at least a receive antenna unit R02, a reception unit 201, a demodulation unit 202, a decoding unit 203, a reception data control unit 204, a physical layer control unit 205, a transmission data control unit 206, a coding unit 207, a modulation unit 208, a transmission unit 209, a transmit antenna unit T02, a radio resource control unit 210, and a network signal transmission/reception unit 211. "Unit" in the drawings is an element that is also expressed by terms such as section, circuit, constituent device, device, and unit, and realizes a function and each procedure of the base station device 2.

The radio resource control unit 210 is a block that executes each function of the Radio Resource Control (RRC) layer that executes radio resource control of the base station device 2. The reception data control unit 204 and the transmission data control unit 206 are blocks that execute each function in a Medium Access Control (MAC) layer that manages a data link layer, a Radio Link Control (RLC) layer, and a Packet Data Convergence Protocol (PDCP) layer.

The base station device 2 may be configured to include multiple reception blocks (the reception unit 201, the demodulation unit 202 and the decoding unit 203) that support multiple frequencies (frequency bands or frequency bandwidths) by carrier aggregation and/or dual connectivity, and multiple transmission blocks (the coding unit 207, the modulation unit 208 and the transmission unit 209). The base station device 2 may be configured to include the multiple reception data control units 204, physical layer control units 205, transmission data control units 206, radio resource control units 210, and network signal transmission/reception units 211.

The radio resource control unit 210 inputs downlink data and downlink control data to the transmission data control unit 206. The transmission data control unit 206 inputs a MAC control element and each data item (downlink data or downlink control data) to the coding unit 207 when there is the MAC control element to transmit to the terminal device 1. The coding unit 207 codes the input MAC control element and each data item, and inputs the coded MAC control element and data item to the modulation unit 208. The modulation unit 208 modulates a coded signal.

The signal modulated by the modulation unit 208 is input to the transmission unit 209. The transmission unit 209 maps the input signal on the frequency domain, converts the frequency domain signal into a time domain signal, allocates the signal on a carrier wave of a predetermined frequency, and amplifies power. The transmission unit 209 may include an RF circuit. A transmission signal output from the transmission unit 209 is transmitted from the transmit antenna unit T02. The physical downlink shared channel in which the downlink control data is allocated typically constitutes a layer 3 message (RRC message).

A receive signal is received by the receive antenna unit R02, and is input to the reception unit 201. The reception unit 201 converts the signal received from the terminal device 1 into a baseband digital signal. When cells of multiple different transmission timings are configured to the terminal device 1, the reception unit 201 receives signals at a different timing for each cell (or for each cell group or for each TA group). The digital signal converted by the reception unit 201 is input to and demodulated by the demodulation unit 202.

The signal demodulated by the demodulation unit 202 is then input to the decoding unit 203. The decoding unit 203 decodes the input signal, and inputs each decoded data item (uplink data and uplink control data) to the reception data control unit 204. The MAC control element transmitted together with each data item from the terminal device 1 is also decoded by the decoding unit 203 and is input to the reception data control unit 204.

The reception data control unit 204 controls the physical layer control unit 205 based on the received MAC control element, buffers each decoded data item, and performs error correction control (HARM) of the retransmitted data. Each data item input to the reception data control unit 204 is input (transferred) to the radio resource control unit 210.

Physical layer control information necessary to control each of these blocks is information including a parameter configuration that is constituted of reception control information and transmission control information and is necessary for radio communication control of the base station device 2. The physical layer control information is configured by a higher network device (an MME, a gateway device (SGW), an OAM, or the like) or system parameters, and is input to the control unit 204 by the radio resource control unit 210 when necessary.

The physical layer control unit 205 inputs the physical layer control information associated with transmission as the transmission control information to each block of the coding unit 207, the modulation unit 208 and the transmission unit 209, and appropriately inputs the physical layer control information associated with reception as the reception control information to each block of the reception unit 201, the demodulation unit 202, and the decoding unit 203.

The reception data control information includes control information related to the uplink of the terminal device 1 for each of the MAC layer, the RLC layer, and the PDCP layer of the base station device 2. The transmission data control information includes control information related to the downlink of the terminal device 1 for each of the MAC layer, the RLC layer, and the PDCP layer of the base station device 2. In other words, the reception data control information and the transmission data control information are configured for each terminal device 1.

The network signal transmission/reception unit 211 transmits (transfers) or receives a control message between the base station devices 2 or between a higher network device (an MME or an SGW) and the base station device 2, or user data. FIG. 2 omits illustration of other components of the base station device 2 and data (control information) transmission routes between the components. However, it is apparent that the base station device 2 includes multiple blocks including other functions necessary to operate as the base station device 2 as the components. For example, a higher level of the radio resource control unit 210 includes a Radio Resource Management unit and an application layer unit.

The receive antenna unit R02 or the transmit antenna unit T02 is typically a planar multiband antenna, but may be constituted by employing an arbitrary antenna meeting transmission capability, a shape, and a purpose of the base station device 2. For example, the receive antenna unit R02 or the transmit antenna unit T02 may be constituted of multiple antenna units or have directivity, or may be integrated. The receive antenna unit R02 and the transmit antenna unit T02 (the reception unit 201 and the transmission unit 209 may be included) may be constituted as one unit (remote radio head, RRH) independent from the base station device 2, and may be disposed at a position different from a position of the base station device 2.

Figure 3:
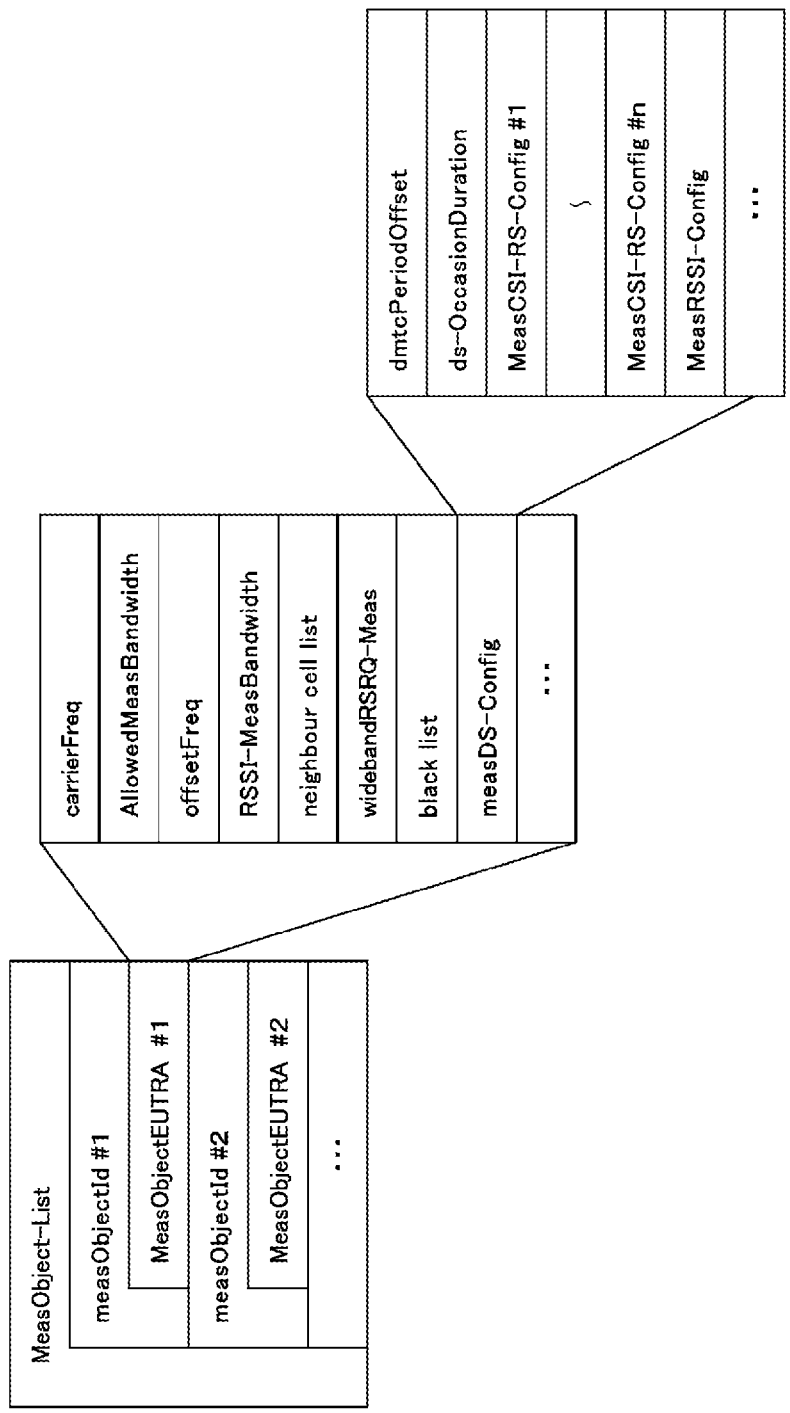
FIG. 3 is a view for describing an example of parameters related to a measurement object according to the embodiment of the present invention.

FIG. 3 is a view for describing parameters (information elements) included in a measurement configuration indicated (configured) from the base station device 2 to the terminal device 1, and related to a measurement object(s).

The base station device 2 can indicate one or more measurement objects by including the measurement objects in a list (MeasObject-List). One measurement object identifier associated with each measurement object is configured. In the example in FIG. 3, two measurement objects of EUTRA (MeasObjectEUTRA#1 and MeasObject-EUTRA#2) are configured, and different measurement object identifiers (measObjId#1 and measObjId#2) are configured to the respective measurement objects of EUTRA. The base station device 2 indicates measurement objects that are to be added, deleted or changed to the terminal device 1 by using the measurement object identifier. In FIG. 3, measurement objects included in the list are not limited to measurement objects of EUTRA, but may be measurement objects (e.g., measurement objects of UTRA (measObjectUTRA) and measurement objects of GERAN (measObject-GERAN) corresponding to other radio access technologies.

The measurement object EUTRA may further include a carrier frequency (carrierFreq), an RSSI measurement bandwidth (RSSI-MeasBandwidth), an allowed measurement bandwidth (AllowedMeasBandwidth), an offset frequency (offsetFreq), information on a neighbouring cell list (neighbor cell list), information on a blacklist, wideband RSRQ measurement (widebandRSRQ-Meas), and a discovery signal measurement configuration (measDS-Config).

The carrier frequency (carrierFreq) is a parameter that uniquely indicates a frequency band and a frequency, and more specifically indicates one integer value used for a variable of a prescribed calculation equation. For example, when the carrier frequency indicates an EUTRA band, the carrier frequency is configured to any value from 0 to 65535. When a non-licensed band is designated as a carrier frequency (carrierFreq), a value in a range different from a range in the related art may be newly configured, and a different calculation equation may be used.

The RSSI measurement bandwidth is a new parameter related to RSSI measurement, and indicates the number of resource blocks a maximum allowed measurement bandwidth is applied when RSSI measurement is performed. The newly added parameter is preferably configured in a supplemental field (extended field) in an RRC message. The base station device 2 designates (indicates) as the RSSI measurement bandwidth the number of resource blocks, for example, one of 6, 15, 25, 50, 75 and 100, to the terminal device 1. When performing the RSSI measurement on the measurement object EUTRA associated with the RSSI measurement bandwidth, the terminal device 1 configures the designated number of resource blocks to the maximum allowed measurement bandwidth. In other words, when performing the RSSI measurement on the frequency related to the measurement object EUTRA including the RSSI measurement bandwidth, the terminal device 1 may perform the RSSI measurement by using the number of resource blocks designated by the RSSI measurement bandwidth as an upper limit of the measurement bandwidth.

Alternatively, the RRSI measurement bandwidth may indicate as the number of resource blocks a minimum request measurement bandwidth applied when RSSI measurement is performed. When performing the RSSI measurement on the measurement object EUTRA associated with the RSSI measurement bandwidth, the terminal device 1 configures the designated number of resource blocks to the minimum request measurement bandwidth. In other words, when performing the RSSI measurement on the frequency related to the measurement object EUTRA including the RSSI measurement bandwidth, the terminal device 1 may perform the RSSI measurement by using the number of resource blocks designated by the RSSI measurement bandwidth as a lower limit of the measurement bandwidth.

When wideband RSRQ measurement (widebandRSRQ-Meas) related to RSRQ measurement is indicated as true, the terminal device 1 may apply a measurement bandwidth (i.e., a measurement bandwidth with six resource blocks or more) applied to the RSRQ measurement as a measurement bandwidth for performing the RSSI measurement.

A discovery signal measurement configuration (measDS-Config) can further include information indicating a periodicity of a discovery signal transmission occasion (DMTC occasion) and a time offset (DMTC periodicity offset (dmtcPeriodOffset)), information indicating a duration of the discovery signal transmission occasion (discovery signal duration (ds-OccasionDuration)), and a CSI-RS resource measurement configuration (MeasCSI-RS-Config). Multiple CSI-RS resource measurement configurations (MeasCSI-RS-Config#1 to MeasCSI-RS-Config#n) can be included in the discovery signal measurement configuration. In this case, the base station device may include identifiers (measurement CSI-RS resource identifiers (MeasCSI-RS-Id)) for identifying multiple CSI-RS resource measurement configurations.

The discovery signal measurement configuration may include a measurement RSSI configuration (MeasRSSI-Config). The above RSSI measurement bandwidth may be included in the measurement RSSI configuration. Other parameters may be included in the discovery signal measurement configuration. The discovery signal measurement configuration (measDS-Config) may be a second discovery signal measurement configuration (measDS-Config2) corresponding to a different discovery signal for a non-licensed band.

Figure 4:
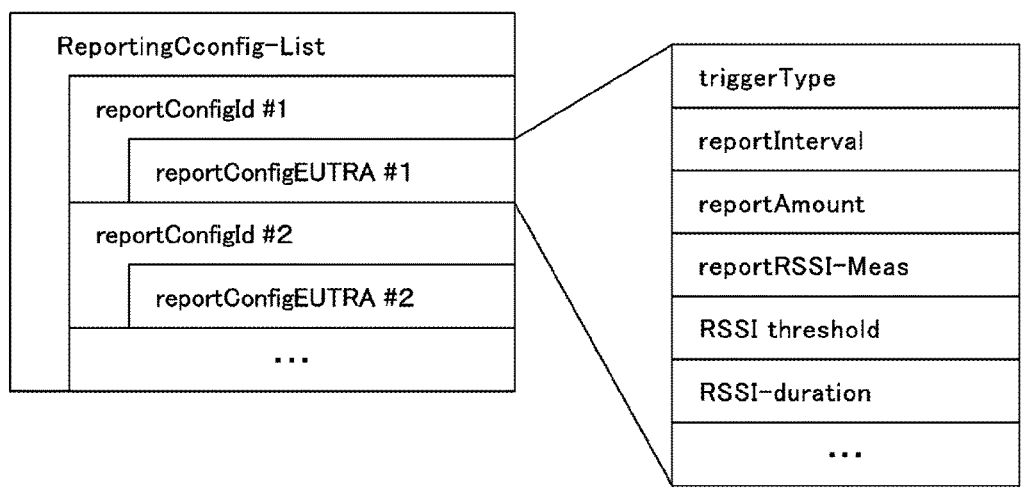
FIG. 4 is a view for describing an example of parameters related to a reporting configuration according to the embodiment of the present invention.

FIG. 4 is a view for describing parameters (information elements) included in a measurement configuration indicated (configured) from the base station device 2 to the terminal device 1, and related to a reporting configuration(s).

The base station device 2 can indicate one or more reporting configurations in the form of a list (ReportingConfig-List). One reporting configuration identifier (reportConfigId) associated with each reporting configuration is configured. In an example in FIG. 4, two reporting configurations of EUTRA (reportConfigEUTRA#1 and reportConfigEUTRA#2) are configured, and different reporting configuration identifiers (reportConfigId#1 and reportConfigId#2) are configured to the respective reporting configurations of EUTRA. The base station device 2 indicates a reporting configuration that is to be added, deleted or changed to the terminal device 1 by using the reporting configuration identifier. In FIG. 4, the reporting configurations included in the list are not limited to the reporting configurations of EUTRA, but may be reporting configurations (e.g., reporting configurations Inter-RAT (reportConfigInterRAT)) corresponding to other radio access technologies.

The reporting configuration EUTRA can further include a trigger type (triggerType), a report interval (reportInterval), a report amount (reportAmount), report RSSI measurement (reportRSSI-Meas), multiple RSSI thresholds, and a measurement RSSI duration (RSSI-duration). Other parameters may be included in the reporting configuration EUTRA. When, for example, the trigger type (triggerType) is an event, the reporting configuration EUTRA may include a parameter (the above hysteresis parameter Hys or the like) corresponding to each event.

The trigger type indicates whether a report trigger defined by the reporting configuration EUTRA is an event report type (event) or a periodical report type (periodical). The event report type executes a measurement report procedure when triggering criteria defined by events A1 to A6, events C1 and C2, and the like are satisfied. Meanwhile, according to the periodical report type, when a certain measurement time passes, a measurement result is periodically reported. The report interval (reportInterval) and the report amount (reportAmount) are parameters used in reporting of the periodical report type.

A time indicated by the report interval is applied as a periodical reporting timer to each measurement identity. The terminal device 1 increments the number of reports sent (numberOfReportsSent) that is an internal variable when the periodical reporting timer expires. The terminal device 1 starts the periodical reporting timer when the number of reports sent is less than the report amount, and removes the associated measurement identity when the number of reports sent is the report amount or more. The terminal device 1 determines that the measurement report is triggered (the measurement report procedure is triggered) when the periodical reporting timer expires.

The report RSSI measurement (reportRSSI-Meas) is a parameter indicating whether to periodically report the RSSI of the frequency of the associated measurement object. In other words, the report RSSI measurement is a parameter indicating whether to execute periodical RSSI measurement report in the terminal device 1. The base station device 2 may configure the report RSSI measurement only when the associated measurement object includes the discovery signal measurement configuration (measDS-Config). When true/false values are designated, the base station device 2 may configure (indicate) a value of the report RSSI measurement to a true value (TRUE) only when the discovery signal measurement configuration (measDS-Config) is included in the associated measurement object (the measurement object of the measurement object identifier linked to the reporting configuration identifier).

The base station device 2 may designate a trigger type for configuring the report RSSI measurement as a periodical report type (periodical) always. The base station device 2 may designate the report amount (reportAmount) for configuring the report RSSI measurement to one always. When the terminal device 1 holds a reportable RSSI result (rssiResults) at the time of a measurement report being triggered, the terminal device 1 may report the RSSI result by including the RSSI result in a measurement report message as a measurement result. When the terminal device 1 holds a reportable RSSI result at the time of a measurement report of the periodical reporting type related to RSSI or the event report type being triggered, the terminal device 1 may report the RSSI result by including the RSSI result in the measurement report message as a measurement result. In this case, when the RSSI result can be reported for the first time, the terminal device 1 may configure a value of the number of reports sent (numberOfReportsSent) that is an internal variable to 0 (zero).

The RSSI threshold is, for example, a parameter necessary for RSSI reporting for a hidden node problem. The RSSI threshold may be an explicit value (e.g., dBm), may be a value of an index mapped on a threshold defined in advance, or may designate a value of a variable introduced in a calculation equation for calculating a threshold. Multiple RSSI thresholds may be configured. The terminal device 1 compares the measured RSSI and the threshold.

When, for example, the base station device 2 indicates threshold 1 and threshold 2 (threshold 1<threshold 2), the terminal device 1 may count the number of times that the RSSI goes below threshold 1, the number of times that the RSSI exceeds threshold 1 and goes below threshold 2, and the number of times that the RSSI exceeds threshold 2. Alternatively, the terminal device 1 may indicate, by rates (percentages), a time during which the RSSI goes below threshold 1, a time during which the RSSI exceeds threshold 1 and goes below threshold 2, and a time during which the RSSI exceeds threshold 2.

The measurement RSSI duration (RSSI-duration) is another parameter that is necessary for an RRSI reporting for a hidden node problem, and indicates a duration length for performing RSSI measurement, for example. The duration length may indicate a contiguous time or may indicate a sum of discontiguous times. The measurement RSSI duration may indicate an explicit value such as a frame, a subframe or millisecond (ms), designate the number of times of discovery signal transmission occasions (DMTC Occasion), indicate a numerical value indicating the number of times of RSSI measurement, indicate a subset duration in the discovery signal transmission occasion (DMTC Occasion) or indicate a subframe for performing RSSI measurement in a bitmap format. The measurement RSSI duration may be designated as an RRC timer. The terminal device 1 may start the RRC timer indicating the measurement RRSI duration when a measurement identity and a reporting configuration are associated with each other. The RRC timer is, for example, timer T322.

In other words, when a measurement identity is added (changed), and in each measurement identity, a trigger type of an associated reporting configuration is a periodical reporting type and the associated reporting configuration includes report RSSI measurement, the terminal device 1 may start the RRC timer indicated by the measurement RSSI duration.

An RSSI threshold and report RSSI measurement (reportRSSI-Meas) may be indicated (configured) as a parameter set listed in the reporting configuration. For example, the base station device 2 may indicate (configure) the measurement RSSI identifier (reportRSSI-Id) associated with each parameter set to add, change or delete the parameter set (including the RSSI threshold and the report RSSI measurement) of the terminal device 1.

When an association of the held measurement identities is changed or a held measurement identity is removed, the terminal device 1 may stop the running RRC timer. The change of the association indicates, for example, that a different measurement configuration identifier or a different report identifier is configured to the same measurement identity (i.e., replace).

An explicit measurement start timing (e.g., a system frame for measurement start and/or a subframe) may be designated to the measurement RSSI duration. Alternatively, the measurement RSSI duration may not be explicitly indicated, and a value defined in advance may be configured as the RRC timer. The terminal device 1 may start such an RRC timer when the measurement identity and the reporting configuration are associated with each other. The measurement RSSI duration may be notified by system information. Multiple predefined values may be switched based on an RRC parameter, or a prescribed value may be configured based on an associated measurement object.

An RSSI measurement method that uses the parameters illustrated in FIGS. 3 and 4 will be described below. A measurement object in FIG. 3 and the reporting configuration in FIG. 4 may be associated on one-on-one basis by the measurement identity (measId). In other words, the base station device 2 indicates (configures) to the terminal device 1 one measurement identity (measId) for associating (linking) one measurement object identifier (measObjectId) in FIG. 3 and one report identifier (reportConfigId) in FIG. 4. The base station device 2 may configure to link multiple other report identifiers (reportConfigId) to one measurement object identifier (measObjectId). Similarly, the base station device 2 may configure to link multiple other measurement object identifiers (meansObjectId) to one report identifier (reportConfigId).

The terminal device 1 is in at least an RRC connected state (RRC_CONNECTED or a communication state), and one or more frequencies of non-licensed bands are configured as measurement objects (measObject). The base station device 2 may configure a primary cell and, in addition, one or more secondary cells (LAA cells) of frequencies of non-licensed bands to the terminal device 1. In other words, the terminal device 1 measures the frequency of the non-licensed band as a serving frequency (intra-frequency) or a non-serving frequency (inter-frequency).

When, in each measurement identity (measId), the discovery signal measurement configuration (measDS-Config) is configured to the associated measurement object, and the associated measurement object includes information (measurement parameter) related to RSSI measurement, the terminal device 1 may perform the RSSI measurement. When, in each measurement identity (measId), the associated measurement object discovery signal measurement configuration (measDS-Config) is configured, and the associated reporting configuration includes information (measurement parameter) related to the RSSI measurement (or the measurement event is configured), the terminal device 1 may apply a discovery signal measurement timing configuration to the frequency of the associated measurement object to perform RSSI measurement.

When, in each measurement identity (measId), the associated measurement object is a measurement object EUTRA, and the associated measurement object includes information (measurement parameter) related to RSSI measurement, the terminal device 1 may determine (decide or estimate) the frequency of the associated measurement object as an applicable frequency for the RSSI measurement (RSSI report). In other words, the terminal device 1 may determine the frequency of the associated measurement object as a frequency of an RSSI measurement (RSSI report) object or a frequency that requires RSSI measurement (RSSI report). When, for example, in each measurement identity (measId), the RSSI measurement bandwidth (RSSI-MeasBandwidth) is configured to the associated measurement object, the terminal device 1 may determine the frequency of the associated measurement object as an applicable frequency for RSSI measurement. The applicable frequency for the RSSI measurement (RSSI report) may be referred to as an "applicable resource for the RSSI measurement (RSSI report)".

When, for example, in each measurement identity (measId), the measurement RSSI configuration (MeasRSSI-Config) is configured to the discovery signal measurement configuration (measDS-Config) of the associated measurement object, the terminal device 1 may determine the frequency of the associated measurement object as an applicable frequency for the RSSI measurement. When, for example, in each measurement identity (measId), a band corresponding to a carrier frequency (carrierFreq) indicated by the associated measurement object is in a non-licensed band, the terminal device 1 may determine the frequency of the associated measurement object as an applicable frequency for the RSSI measurement.

When, in each measurement identity (measId), the associated measurement object is a measurement object EUTRA and the associated reporting configuration includes information (measurement parameter) related to the RSSI measurement, the terminal device 1 may determine the frequency of the measurement object associated with the associated reporting configuration as an applicable frequency for the RSSI measurement. When, for example, in each measurement identity (measId), report RSSI measurement (reportRSSI-Meas) is configured to the associated reporting configuration, the terminal device 1 may determine the frequency of the associated measurement object as an applicable frequency for the RSSI measurement. When, for example, in each measurement identity (measId), a measurement event related to RSSI is configured to the associated reporting configuration, the terminal device 1 may determine the frequency of the associated measurement object as an applicable frequency for the RSSI measurement.

In addition to the above, when the discovery signal measurement configuration (measDS-config) is configured to the associated measurement object, the terminal device 1 may determine the frequency of the associated measurement object as an applicable frequency for the RSSI measurement. The applicable frequency for the RSSI measurement may be referred to as an object frequency of a measurement report (measurement report trigger), or may be referred to as a frequency of a report object of a measurement report message. The measurement object is not limited to the measurement object EUTRA, and may be an inter-RAT measurement object or may be a measurement object (e.g., measurement object LAA) added for LAA.

When the applicable frequency for the RSSI measurement is a frequency of the secondary cell, the terminal device 1 measures RSRP and RSRQ of the CRS without applying the discovery signal measurement timing configuration included in the associated measurement object in a case of an activated state of the associated secondary cell, applies the discovery signal measurement timing configuration included in the associated measurement object and measures the RSRP and the RSRQ of the CRS in the discovery signal duration, in a case of the deactivated state of the associated secondary cell. When the terminal device 1 supports CRS-based discovery signal measurement and the associated secondary cell is in the deactivated state, the terminal device 1 may apply a discovery signal measurement timing configuration when measuring the RSRP and the RSRQ of the CRS of the secondary cell (performing CRS measurement).

When the terminal device 1 supports CSI-RS-based discovery signal measurement, the terminal device 1 may apply a discovery signal measurement timing configuration when measuring the RSRP and the RSRQ of the CSI-RS resource. When the applicable frequency for the RSSI measurement is the frequency of the secondary cell, the terminal device 1 may always apply the discovery signal measurement timing configuration included in the associated measurement object, irrespective of the state (the activated state or the deactivated state) of the associated secondary cell, and measure the RSSI in the discovery signal duration.

When the applicable frequency for the RSSI measurement is the non-serving frequency (i.e., inter-frequency), the terminal device 1 may apply the discovery signal measurement timing configuration included in the associated measurement object, and measure the RSSI in the discovery signal duration. When the terminal device 1 supports the CRS-based discovery signal measurement and the associated frequency is the non-serving frequency, the terminal device 1 may apply the discovery signal measurement timing configuration when measuring the RSRP and the RSRQ of the CRS (performing CRS measurement) of a neighboring cell.

When, in the above procedure, the discovery signal measurement timing configuration is not included in the associated measurement object, the terminal device 1 may not perform a procedure of applying the discovery signal measurement timing configuration.

The terminal device 1 may measure the RSSI in units of OFDM symbols. The terminal device 1 may measure the RSSIs only in the OFDM symbol including the CRS, or only in an OFDM symbol from which the CRS is detected. The terminal device 1 may measure the RSSIs in all OFDM symbols. The terminal device 1 may configure the discovery signal duration (ds-OccasionDuration) as a measurement subframe, and average the RSSIs measured in the discovery signal duration (ds-OccasionDuration) to obtain the average value as a measurement result. The terminal device 1 may measure the RSSIs in the entire discovery signal duration (ds-OccasionDuration) or part of OFDM symbols, and average the measured RSSIs to obtain the average value as a measurement result. The terminal device 1 may periodically measure the RSSIs in the discovery signal duration (ds-OccasionDuration) per certain time, and average the measured RSSIs to obtain the average value as a measurement result. In other words, the terminal device 1 may divide the discovery signal duration (ds-OccasionDuration) into fixed time sections (e.g., a fixed subframe units), measure the RSSIs in the entire divided time sections or part of OFDM symbols, and average the measured RSSIs to obtain the average value as an average result.

The terminal device 1 may configure the discovery signal transmission occasion (DMTC occasion) as a measurement subframe, and average the RSSIs measured in the discovery signal transmission occasion (DMTC occasion) to obtain the average value as the measurement result. The terminal device 1 may measure the RSSIs in the entire discovery signal transmission occasion (DMTC occasion) or part of OFDM symbols, and average the measured RSSIs to obtain the average value as a measurement result. The terminal device 1 may periodically measure the RSSIs in the discovery signal transmission occasion (DMTC occasion) per fixed time, and average the measured RSSIs to obtain the average value as a measurement result. In other words, the terminal device 1 may divide the discovery signal transmission occasion (DMTC occasion) into fixed time sections (e.g., in certain subframe units), measure the RSSIs in the entire divided time sections or part of OFDM symbols, and average the measured RSSIs to obtain the average value as a measurement result.

The terminal device 1 may use for RSSI measurement only a specific OFDM symbol based on information designated by the base station device 2 in the discovery signal duration (ds-OccasionDuration) or the discovery signal transmission occasion (DMTC occasion), use for the RSSI measurement a CSI-RS resource designated by a CSI-RS resource measurement configuration (MeasCSI-RSConfig), or use for the RSSI measurement only a specific subframe. The terminal device 1 may not perform the RSSI measurement in the frequency of the secondary cell in the activated state.

The terminal device 1 sets an RSSI result to the measurement result (measResults) for the measurement identity associated with the measurement report triggered based on the reporting configuration, and transmits the measurement result by including the measurement result in the measurement report message to the base station device 2. More specifically, when, in the measurement identity associated with the triggered measurement report, there is at least an applicable frequency for RSSI measurement for reporting, the terminal device 1 may include RSSI results of multiple applicable frequencies in the measurement report message until the frequency reaches the designated maximum number of frequencies (maxReportFrequency). Multiple applicable frequencies may be multiple frequencies associated with the measurement identity. When the measurement results of multiple frequencies are included, the measurements results are included in order (descending order) from a better RSSI. When, for example, the trigger type is the periodical report type, the terminal device 1 includes RSSI result of at least one applicable frequency for RSSI measurement in a new measurement result that is available (reportable) after the last periodical report. The RSSI result (of the applicable frequency) obtained by the RSSI measurement may be reported in a different format based on the reporting configuration. When the RSSI result is based on a specific configuration, the RSSI result is simultaneously reported with the identifier corresponding to such a configuration. As long as, for example, the RSSI measurement is based on the CSI-RS resource measurement configuration, the terminal device 1 may include the measurement CSI-RS resource identifier (MeasCSI-RS-Id) together with the RSSI result in the measurement result.

The terminal device 1 may include a value obtained by averaging (layer 3 filtering) RSSI measurement values as the RSSI result in the measurement result. By averaging the RSSI measurement results, it is possible to report the RSSI value from which an influence of temporal fluctuation of the RSSI is removed. Even when the non-licensed band is in the busy state, and the RSRP and the RSRQ cannot be measured, the terminal device 1 can report reception strength of a signal in the non-licensed band to the base station device 2 by measuring the RSSI.

The terminal device 1 may report a result obtained by comparing each of the RSSI measurement values with RSSI thresholds, by including the result in the measurement result. For example, the terminal device 1 may compare the measured RSSI measurement result and the indicated RSSI threshold, aggregate values corresponding to data (frequency) of a histogram or a frequency distribution table, and report the aggregated result by including the aggregated result in the measurement result. In other words, the RSSI threshold defines the number of bins (bin range) in the histogram. In other words, the RSSI threshold defines the number of classes in the frequency distribution table. When, for example, two values are indicated as the RSSI thresholds, the number of bins is three for the histogram, and the number of classes is three for the frequency distribution table.

The base station device 2 may explicitly include histogram report RSSI measurement (reportRSSI-Hist-Meas) in the reporting configuration as a measurement parameter indicating to report the measured RSSI in a histogram format (or the frequency distribution format). When the histogram report RSSI measurement is configured (indicated) (e.g., a value is configured to TRUE), the RSSI threshold and the measurement RSSI duration may be configured to be effective. Alternatively, the RSSI threshold and the measurement RSSI duration may be configured (indicated) only when the histogram report RSSI measurement is configured.

When the histogram report RSSI measurement is configured (indicated), the terminal device 1 may not perform the layer 3 filtering on the RSSI result reported in the histogram format. When, for example, the histogram report RSSI measurement is configured (indicated), the terminal device 1 may regard a layer 3 filtering coefficient as 0 (zero). In other words, the terminal device 1 may ignore the layer 3 filtering coefficient. When the histogram report RSSI measurement is configured (indicated), the terminal device 1 may not apply the layer 3 filtering coefficient to the RSSI result.

When the measurement report in the histogram format (frequency distribution format) is not requested (configured), the terminal device 1 performs a normal RSSI report (first RSSI report) to which the layer 3 filtering is applicable. When the measurement report in the histogram format (frequency distribution format) is requested (configured), the terminal device 1 may report in the histogram format (frequency distribution format) (second RSSI report). When performing the second RSSI report, the terminal device 1 may report the second RSSI report and, in addition, the first RSSI report by including the reports in the measurement report message.

When performing the normal RSSI report (first RSSI report), and being able to report the measured RSSI at the frequency of the associated measurement object, the terminal device 1 may determine that the measurement report of the associated measurement identity is triggered. When the normal RSSI report (first RSSI report) is performed, and the measurement result of the primary cell is effective, and the strongest cell is decided from neighboring cells detected at the frequency of the associated measurement object, the terminal device 1 may determine that the measurement report of the associated measurement identity is triggered.

When the RSSI report (second RSSI report) in the histogram format is performed, and a time indicated by the measurement RSSI duration passes at the frequency of the associated measurement object, the terminal device 1 may determine that the measurement report of the associated measurement identity is triggered. When the RSSI report (second RSSI report) in the histogram format is performed, and the RRC timer indicated by the measurement RSSI duration expires at the frequency of the associated measurement object, the terminal device 1 may determine that the measurement report of the related measurement identity is triggered.

Figure 5:
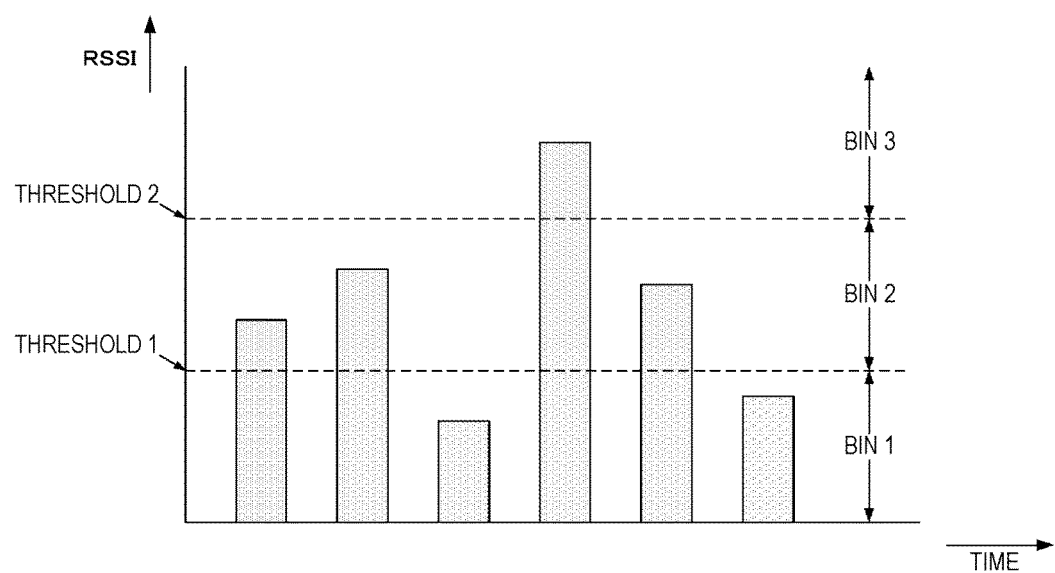
FIG. 5 is a view for describing an example of an RSSI reporting method according to the embodiment of the present invention.

The report in the histogram format (frequency distribution format) will be more specifically described. An example where the RSSI result is obtained for each measurement as illustrated in FIG. 5, and threshold 1 and threshold 2 are indicated will be described. FIG. 5 illustrates that the number of RSSI measurement values lower than threshold 1 is two, the number of RSSI measurement values equal to or more than threshold 1 and lower than threshold 2 is three, and the number of RSSI thresholds equal to more than threshold 3 is one. In this case, when the measurement report in the histogram format (frequency distribution format) is requested (configured), the terminal device 1 transmits, to the base station device 2 as the measurement result, {bin 1,bin 2,bin 3}={2,3,1} that is an information element (field) by including the information element in the measurement report message.

When the measurement report in the histogram format (frequency distribution format) is requested (configured), and an actual measurement time (or the number of times of measurement) is less than a total time (measurement RSSI duration) for performing the RSSI measurement, the terminal device 1 may not perform the RSSI report in the histogram format. In other words, unless a time (or the number of times of measurement) indicated by the measurement RSSI duration is satisfied, the terminal device 1 may regard that there is no applicable frequency for the RSSI measurement or there is no reportable RSSI result.

When the terminal device 1 performs the RSSI measurement in the histogram format and cannot simultaneously measure other frequencies, the terminal device 1 may not perform measurement for the other frequencies (inter-frequency measurement). In other words, the terminal device 1 may apply a different measurement requirement depending on cases of measuring the RSSI in the histogram format or other cases. The terminal device 1 may implicitly alleviate measurement requirement of a frequency necessary to measure the RSSI in the histogram format, or alleviate the measurement requirement only for the frequency to which a measurement parameter (reduction measurement requirement (reducedMeasPerformanc)) explicitly indicating that the measurement requirement can be alleviated is configured. For example, the terminal device 1 may alleviate (extend) a measurement requirement time by a time necessary to measure the RSSI in the histogram format. Alternatively, the terminal device 1 may preferentially measure the frequency necessary to measure the RSSI in the histogram format, and alleviate measurement requirement for other frequencies.

Figure 6:
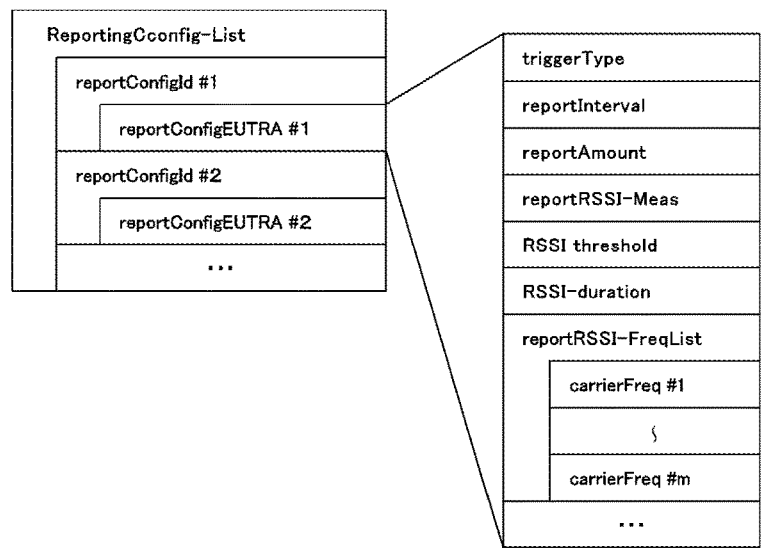
FIG. 6 is a view for describing another example of the parameters related to the reporting configuration according to the embodiment of the present invention.

FIG. 6 is another view for describing another example of parameters related to a reporting configuration according to the embodiment of the present invention. The base station device 2 may transmit (indicate) a report RSSI frequency list (reportRSSI-FreqList) by including the report RSSI frequency list in the reporting configuration to the terminal device 1.

The report RSSI frequency list (reportRSSI-FreqList) can include one or multiple (one to m (m is an integer)) carrier frequencies (carrierFreq). When a measurement object is a measurement object EUTRA and the reporting configuration includes a measurement parameter related to the report RSSI frequency list, the terminal device 1 may determine the carrier frequency indicated by the report RSSI frequency list as an applicable frequency for the RSSI measurement. In other words, the terminal device 1 may determine each carrier frequency (carrierFreq) included in the report RSSI frequency list (reportRSSI-FreqList) of the reporting configuration as an applicable frequency for the RSSI measurement.

When the report RSSI frequency list is configured, and a measurement report is triggered, the terminal device 1 may report an RSSI of the frequency indicated by the report RSSI frequency list with the measurement report. When the report RSSI frequency list is configured, and the measurement report related to the RSSI is triggered, the terminal device 1 may report the RSSI of the frequency indicated by the report RSSI frequency list with the measurement report. In this case, the terminal device 1 may rearrange RSSIs to be reported in descending order (i.e., in order of stronger dBm of RSSIs) to report. The terminal device 1 may limit the number of RSSIs to be reported among the measured RSSIs to a certain number (e.g., three frequencies) to report. The number of RSSIs (frequencies) to be reported (maxReportFrequencies) may be indicated as another parameter of the reporting configuration by an RRC message from the base station device 2.

When the frequency indicated by the report RSSI frequency list is the frequency of the secondary cell, the terminal device 1 measures the RSRP and the RSRQ of the CRS without applying a discovery signal measurement timing configuration included in the associated measurement object in a case of an activated state of the associated secondary cell, applies the discovery signal measurement timing configuration included in the associated measurement object, and measures the RSRP and the RSRQ of the CRS in the discovery signal duration in a case of a deactivated state of the associated secondary cell. When the terminal device 1 supports the CRS-based discovery signal measurement and the associated secondary cell is in the deactivated state, and the RSRP and the RSRQ of the CRS of the secondary cell is measured (CRS measurement is performed), the terminal device 1 may apply the discovery signal measurement timing configuration.

When the frequency indicated by the report RSSI frequency list is the frequency of the secondary cell, the terminal device 1 may always apply the discovery signal measurement timing configuration included in the associated measurement object, irrespective of the state (the activated state or the deactivated state) of the associated secondary cell, and measure the RSSI in the discovery signal duration. When the frequency indicated by the report RSSI frequency list is the non-serving frequency, the terminal device 1 may apply the discovery signal measurement timing configuration included in the associated measurement object, and measure the RSSI in the discovery signal duration. When the discovery signal measurement timing configuration is not included in the associated measurement object, the terminal device 1 may not perform the above procedure.

The terminal device 1 according to the present embodiment can appropriately determine (decide or estimate) the frequency for measuring the RSSI and a measurement time (measurement duration) of the RSSI measurement at the frequency based on the measurement parameter related to the RSSI measurement indicated (configured) by the RRC message from the base station device 2. The terminal device 1 can measure RSSIs of one or multiple frequencies based on the measurement parameter related to the RSSI measurement, and transmit the measurement result by including the measurement result in the measurement report message. Even when the RSRP or the RSRQ cannot be measured due to the busy state, the terminal device 1 can efficiently measure the RSSIs of one or multiple frequencies based on the measurement object or the measurement parameter related to the RSSI indicated by the reporting configuration.

The base station device 2 according to the present embodiment can indicate (configure) by using an RRC message the measurement parameter related to the RSSI measurement for uniquely determining (deciding or estimating) the frequency for measuring the RSSI and the measurement time (measurement duration) of the RSSI measurement at the frequency to the terminal device 1. The base station device 2 can receive a measurement report message including the measurement result of the appropriate RSSI from the terminal device 1. Even when the RSRP or the RSRQ cannot be measured due to the busy state, the base station device 2 can transmit the measurement object or the measurement parameter related to the RSSI indicated by the reporting configuration to the terminal device 1 to cause the terminal device 1 to determine a frequency necessary for an RSSI report, and to perform the RSSI measurement on the frequency, so that it is possible to provide the efficient measurement method to the terminal device 1.

Second Embodiment

The second embodiment of the present invention will be described below.

In the first embodiment, an example where the reporting configuration includes the report RSSI frequency list (reportRSSI-FreqList) to include multiple RSSI reports in the measurement report has been described. However, in consideration of a configuring method where one measurement object corresponds to one frequency in EUTRA, one measurement identity (measId) may be extended to handle multiple frequencies (i.e., measurement objects). An example of the extending method will be described. The constitutions of the terminal device 1 and the base station device 2 according to the present embodiment may be the same configuration as those in FIGS. 1 and 2, and therefore description for the constitutions are omitted.

Figure 7:
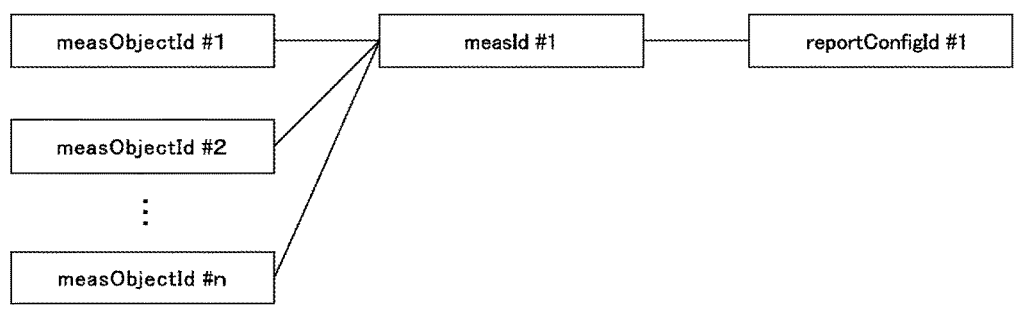
FIG. 7 is a view for describing an association of the measurement objects according to the embodiment of the present invention.

FIG. 7 illustrates that one reporting configuration identifier (reportConfigId #1) and multiple measurement object identifiers (measObjectIds #1 to #n) are linked by one measurement identity (measId #1). An association (link) between the reporting configuration and the measurement object is individually indicated (configured) by the base station device 2.

When the identifiers illustrated in FIG. 7 are associated with each other, and at the time of deletion of a certain measurement object identifier (e.g., measObjectId #1), there is another measurement object identifier (measObjectId #2) linked to the related measurement identity (e.g., measId #1), the terminal device 1 may not remove the associated measurement identity (measId #1).

In this case, when, in each measurement identity (measId), each associated measurement object is a measurement object EUTRA, and the associated reporting configuration includes a parameter related to RSSI measurement, the terminal device 1 may determine one or multiple measurement object frequencies associated with the associated reporting configuration as applicable frequencies (applicable set of frequencies) for RSSI measurement.

When, for example, in each measurement identity (measId), report RSSI measurement (reportRSSI-Meas) is configured to the associated reporting configuration, the terminal device 1 may determine one or multiple associated measurement object frequencies as the applicable frequencies (applicable set of frequencies) for the RSSI measurement. When, for example, in each measurement identity (measId), a measurement event related to RSSI is configured to the associated reporting configuration, the terminal device 1 may determine one or multiple associated measurement object frequencies as the applicable frequencies (applicable set of frequencies) for the RSSI measurement.

Figure 8:
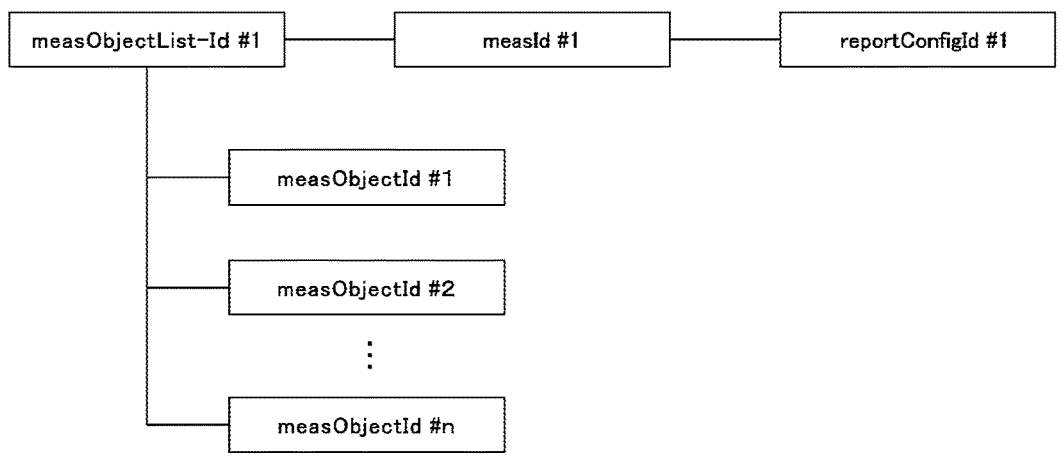
FIG. 8 is a view for describing an association between the measurement objects and a measurement object list according to the embodiment of the present invention.

FIG. 8 illustrates an example of a measurement configuration where a measurement object list identifier (measObjectList-Id) is added as a new parameter. The measurement object list identifier (measObjectList-Id) can include one or multiple measurement object identifiers (measObjectId #1 to #n in the example in FIG. 8). FIG. 8 illustrates that one reporting configuration identifier (reportCopnfigId #1) and one measurement object list identifier (measObjectList-Id #1) are linked by one measurement identity (measId #1). The association (link) between the reporting configuration and the measurement object list is individually indicated (configured) by the base station device 2.

In this case, when, in each measurement identity (measId), the measurement object included in the associated measurement object list is a measurement object EUTRA, and the associated reporting configuration includes a measurement parameter related to RSSI measurement, the terminal device 1 may determine one or multiple measurement object frequencies included in the measurement object list associated with the associated reporting configuration as applicable frequencies (applicable set of frequencies) for RSSI measurement.

When, for example, in each measurement identity (measId), report RSSI measurement (reportRSSI-Meas) is configured to the associated reporting configuration, the terminal device 1 may determine one or multiple measurement object frequencies included in the associated measurement object list as the applicable frequencies (applicable set of frequencies) for the RSSI measurement. When, for example, in each measurement identity (measId), a measurement event related to RSSI is configured to the associated reporting configuration, the terminal device 1 may determine one or multiple measurement object frequencies included in the associated measurement object list as the applicable frequencies (applicable set of frequencies) for the RSSI measurement.

Figure 9:
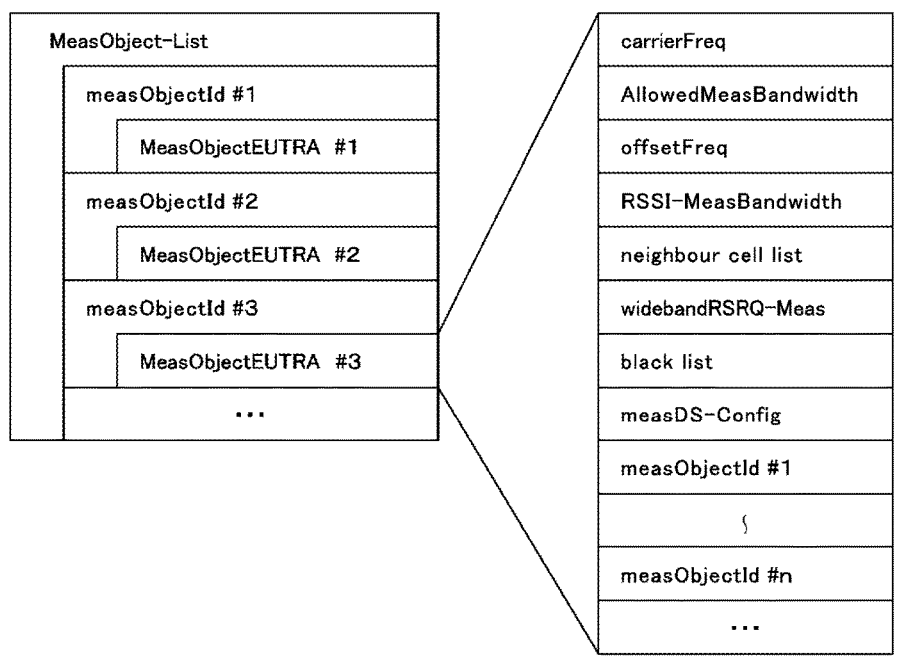
FIG. 9 is a view for describing an example of the parameters related to the measurement object according to the embodiment of the present invention.

FIG. 9 illustrates an example of a measurement object extended to include a measurement object identifier (measObjectId) indicating another measurement object. The measurement object can include one or multiple measurement object identifiers (MeasObjectId #1 to #n in the example in FIG. 9). One reporting configuration and one measurement object are linked by one measurement identity (measId #1). An association (link) between the reporting configuration and the measurement object EUTRA band is individually indicated (configured) by the base station device 2.

In this case, when, in each measurement identity (measId), a measurement object identifier included in the associated measurement object is a measurement object EUTRA, and the associated reporting configuration includes a measurement parameter related to RSSI measurement, the terminal device 1 may determine the frequency of the associated measurement object, and frequencies of measurement objects associated with one or multiple measurement object identifiers included in the measurement object associated with the associated reporting configuration as applicable frequencies (applicable set of frequencies) for the RSSI measurement.

When, for example, in each measurement identity (measId), report RSSI measurement (reportRSSI-Meas) is configured to the associated reporting configuration, the terminal device 1 may determine the frequency of the associated measurement object, and frequencies of measurement objects associated with one or multiple measurement object identifiers included in the associated measurement object as applicable frequencies (applicable set of frequencies) for the RSSI measurement. When, for example, in each measurement identity (measId), a measurement event related to RSSI is configured to the associated reporting configuration, the terminal device 1 may determine the frequency of the associated measurement object, and frequencies of measurement objects associated with one or multiple measurement object identifiers included in the associated measurement object as applicable frequencies (applicable set of frequencies) for the RSSI measurement.

Figure 10:
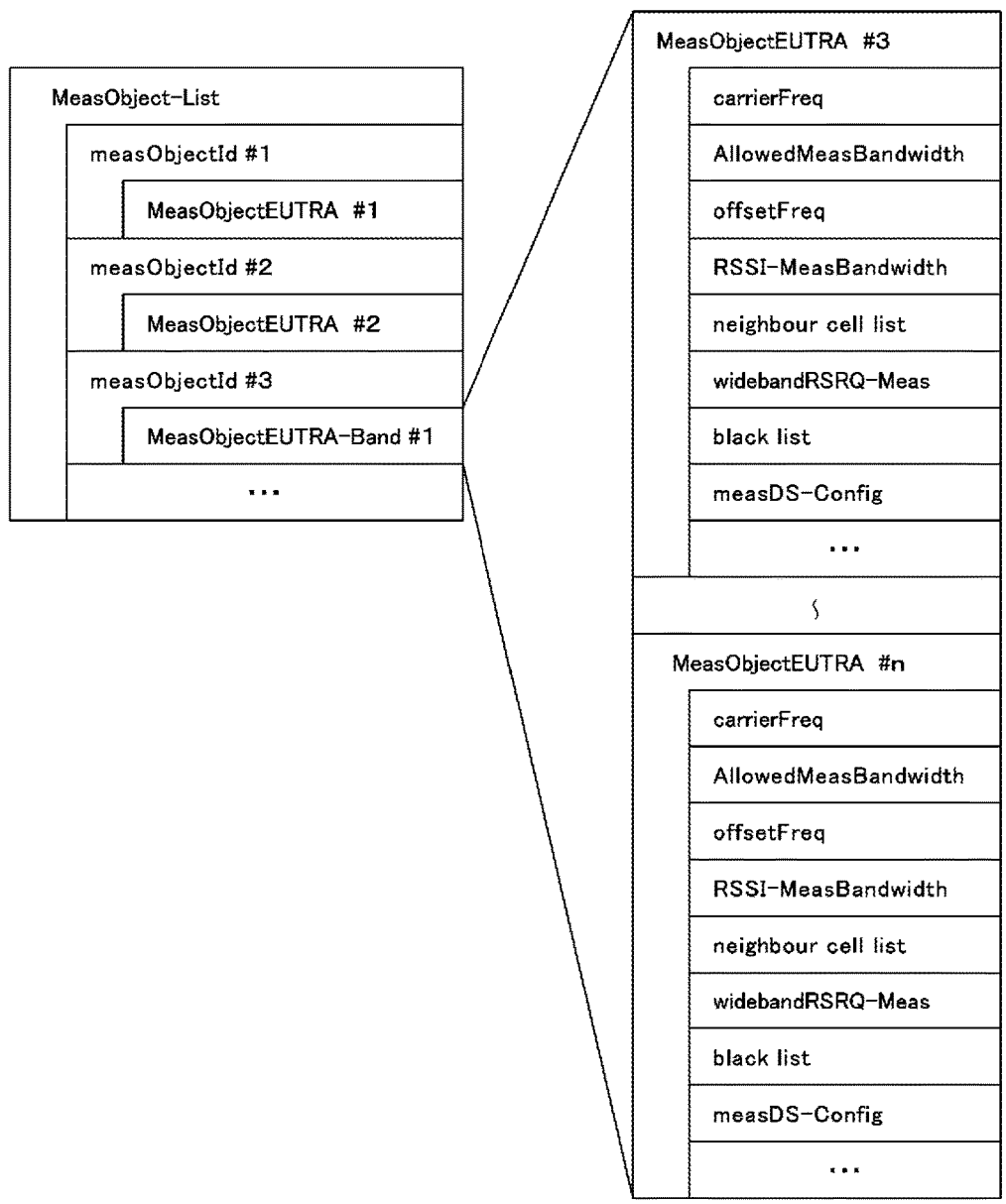
FIG. 10 is a view for describing an example of the parameters related to the measurement object according to the embodiment of the present invention.

FIG. 10 illustrates an example of a measurement object where a measurement object EUTRA band (measObjectEUTRA-Band) that means an EUTRA band (frequency band) as a measurement object is added as a new parameter. The measurement object EUTRA band (measObjectEUTRA-Band) can include one or multiple measurement objects of EUTRA (MeasObjectEUTRA #1 to #n in the example in FIG. 10). One reporting configuration and one measurement object EUTRA band are linked by one measurement identity (measId #1). An association (link) between the reporting configuration and the measurement object EUTRA band is individually indicated (configured) by the base station device 2.

In this case, when, in each measurement identity (measId), the measurement object included in the associated measurement object EUTRA band is a measurement object EUTRA, and the associated reporting configuration includes a measurement parameter related to RSSI measurement, the terminal device 1 may determine one or multiple measurement object frequencies included in the measurement object EUTRA band associated with the associated reporting configuration as applicable frequencies (applicable set of frequencies) for RSSI measurement.

When, for example, in each measurement identity (measId), report RSSI measurement (reportRSSI-Meas) is configured to the associated reporting configuration, the terminal device 1 may determine one or multiple measurement object frequencies included in the associated measurement object EUTRA band as the applicable frequencies (applicable set of frequencies) for the RSSI measurement. When, for example, in each measurement identity (measId), a measurement event related to RSSI is configured to the associated reporting configuration, the terminal device 1 may determine one or multiple measurement object frequencies included in the measurement object EUTRA band as the applicable frequencies (applicable set of frequencies) for the RSSI measurement.

The terminal device 1 according to the present embodiment can appropriately determine (decide or estimate) one or multiple applicable frequencies for the RSSI measurement based on the measurement parameter related to the RSSI measurement indicated (configured) by an RRC message from the base station device 2. The terminal device 1 can measure the RSSIs of one or multiple frequencies for one measurement identity, and transmit a measurement result by including the measurement result in a measurement report message. Even when the RSRP or the RSRQ cannot be measured due to the busy state, the terminal device 1 can efficiently measure the RSSIs of one or multiple frequencies based on the measurement object or the measurement parameter related to the RSSI indicated by the reporting configuration.

The base station device 2 according to the present embodiment can indicate (configure) the measurement parameter related to the RSSI measurement for uniquely determining (deciding or estimating) one or multiple applicable frequencies for the RSSI measurement, to the terminal device 1 by the RRC message. The base station device 2 can receive the measurement report message including measurement results of the RSSIs of one or multiple frequencies measured for one measurement identity. Even when the RSRP or the RSRQ cannot be measured due to the busy state, the base station device 2 can transmit the measurement object or the measurement parameter related to the RSSI indicated by the reporting configuration to the terminal device 1 to cause the terminal device 1 to determine one or multiple frequencies necessary for an RSSI report, and to perform the RSSI measurement on the frequency, so that it is possible to provide the efficient measurement method to the terminal device 1.

The above-described embodiments are only exemplary embodiments, and can be realized by using various modified examples and replacement examples. For example, a transmission method to be used is also applicable to communication systems, that use a frequency division duplex (FDD) method, a time division duplex (TDD) method and both of the transmission methods for each frequency. Names related to each parameter and various operations described in the embodiments are used for the sake of description. Differences between actually applied names and the names in the embodiments of the present invention do not influence the scope of the invention claimed in the embodiments of the present invention.

Herein, the "Connection" used in each embodiment is not limited to a configuration where a certain device and another certain device are directly connected by using a physical line, and includes a constitution of logical connection and a constitution of radio connection established via the same or different radio technology.

The contents described by using specific numerical values are examples of simple numerical values used for the sake of description, and may be applied any appropriate values.

An entity used in each embodiment may be regarded as a synonym of a sublayer. In other words, description can be given by replacing an RRC entity, a PDCP entity, a RLC entity and a MAC entity with an RRC sublayer, a PDCP sublayer, a RLC sublayer and a MAC sublayer, respectively.

The terminal device 1 includes not only portable or movable mobile station devices but also, a fixed-type or a stationary-type electronic apparatus installed indoors or outdoors, for example, an audio-video (AV) apparatus, a kitchen apparatus, a cleaning or washing machine, an air-conditioning apparatus, office equipment, a vending machine, and other household apparatuses, and devices such as measurement devices, in-vehicle devices, and wearable devices that can be equipped and healthcare devices with a communication function provided. The terminal device 1 may be used not only for device-to-device communication (machine type communication), but also for person-to-person communication, person-to-device communication, vehicle-to-person communication, vehicle-to-vehicle communication and communication between a construction on a road and vehicle (road-to-vehicle).

The terminal device 1 is also referred to as a user terminal, a mobile station device, a communication terminal, a mobile machine, a terminal, a user equipment (UE) and a mobile station (MS). The base station device 2 is also referred to as a radio base station device, a base station, a radio base station, a stationary station, a nodeB (NB), an evolved Node B (eNB), a base transceiver station (BTS) and a base station (BS).

The base station device 2 is referred to as an NB in UMTS defined by 3GPP, and is referred to as an eNB in EUTRA and Advanced EUTRA. The terminal device 1 in UMTS, EUTRA and Advanced EUTRA defined by 3GPP is referred to as a UE.

For the sake of description, a specific combination of a method, means and algorithm steps for realizing a function of each unit or part of these functions of the terminal device 1 and the base station device 2 has been described using functional block diagrams. However, these combinations can be directly embodied by a hardware, a software module executed by a processor and a combination of these.

When the functions are implemented as hardware, the terminal device 1 and the base station device 2 may be constituted of the components in the block diagram and, in addition, a power feeding device and a battery that feed power to the terminal device 1 and the base station device 2, a display device such as liquid crystal, a display driving device, a memory, an input/output interface, an input/output terminal, speakers and a combination of other peripheral devices.

When functions are implemented as software, the functions can be retained as one or more instructions or codes on computer-readable media and transmitted. The computer-readable media include both of communication media and computer recording media that include media that help carrying of computer programs from one place to another place.

The one or more instructions or codes may be recorded in the computer-readable recording media to cause a computer system to read and execute one or more commands or codes recorded in the recording media and control the terminal device 1 and the base station device 2. The "computer system" herein refers to hardware components such as an OS and peripheral devices.

An operation described in each embodiment of the present invention may be realized by a program. The programs that run on the terminal device 1 and the base station device 2 related to each embodiment of the present invention are programs (a program causing a computer to function) configured to control a CPU or the like to realize the functions of the above-described embodiments related to embodiments of the present invention. The information handled by these devices is temporarily accumulated in a RAM at the time of processing, is then stored in various ROMs and HDDs, is read out by the CPU as necessary, and edited and written.

In addition to realizing the functions of the above-described embodiments by executing programs, the functions of the present invention are realized by the programs running cooperatively with an operating system, other application programs, or the like in accordance with instructions included in those programs.

The "computer-readable recording media" include portable media such as semiconductor media (e.g., RAMs and non-volatile memory cards), optical recording media (e.g., DVDs, MOs, MDs, CDs and BDs), magnetic recording media (e.g., magnetic tapes and flexible disks), and storage devices such as disk units built in computer systems. Moreover, the "computer-readable recording medium" may include a medium that dynamically retains the program for a short period of time, such as a communication line that is used to transmit the program over a network such as the Internet or over a communication circuit such as a telephone circuit, and a medium that retains the program for a fixed period of time, such as a volatile memory within the computer system which functions as a server or a client.

Furthermore, the program may be configured to realize some of the functions described above, and also may be configured to be capable of realizing the functions described above in combination with a program already recorded in the computer system.

Part or all of each function blocks or some features of the terminal device 1 and the base station device 2 used in each embodiment may be realized (executed) by a general-purpose processor, a digital signal processor (DSP), an integrated circuit for specific use (ASIC) or an arbitrary integrated circuit (IC) for general use, a field programmable gate array signal (FPGA), other programmable logic devices, a discrete gate or a transistor logic, a discrete hardware component or a combination of these designed to exhibit at least the functions described herein.

Furthermore, some or all of the function blocks or some features of the terminal device 1 and the base station device 2 according to the above-described embodiment may be realized (executed) as at least an electric circuit designated to exhibit functions described herein, typically an LSI that is an integrated circuit, or may be realized (executed) as a chip set. The chip set may be configured to include other components such as an antenna. and a passive part. The functional blocks of the terminal device 1 and the base station device 2 may be individually realized as a chip, or some or all of the functional blocks may be integrated into a chip. The circuit integration technique is not limited to LSI, and the integrated circuits for the functional blocks may be realized as dedicated circuits or a multi-purpose processor. Furthermore, in cases with advances in semiconductor technology, a circuit integration technology with which an LSI is replaced appears, it is also possible to use an integrated circuit based on the technology.

The general-purpose processor may be a microprocessor, but a processor may be a processor, controller, micro controller or state machine in the related art. The general-purpose processor or each of the above circuits may be configured as a digital circuit, be configured as an analog circuit or include both of the digital circuit and the analog circuit.

The processor may be mounted as a combination of computing devices. For example, a combination of the DSP and the microprocessor, a combination of multiple microprocessors, a combination of a DSP core and one or more connected microprocessors and other such configurations may be used.

The embodiments of the present invention have been described in detail based on the specific examples. Naturally, the scope of each embodiment of the present invention and the claims are not limited to these specific examples, and include design changes without departing from the scope of the present invention. In other words, the disclosure of this description intends to describe the exemplary embodiments, and by no means limits each embodiment of the present invention.

Furthermore, various modifications are possible within the scope of the present invention defined by claims, and embodiments that are made by suitably combining technical means disclosed according to the different embodiments are also included in the technical scope of the embodiments of the present invention. Furthermore, a configuration in which a constituent element that achieves the same effect is substituted for the one that is described according to the embodiments is also included in the technical scope of the present invention.

SUPPLEMENTARY NOTE

The present invention can be expressed as follows.

In other words, a terminal device according to the embodiments of the present invention configures a primary cell and one or more secondary cells. When a discovery signal measurement timing configuration indicating a transmission timing of a discovery signal is included in a measurement object associated with a frequency of a secondary cell in a deactivated state, the terminal device applies a discovery signal measurement timing configuration to measurement of Reference Signal Received Power (RSRP) and Reference Signal Received Quality (RSRQ) of the secondary cell in the deactivated state. When, in each configured measurement identity, the associated reporting configuration includes information related to a Received Signal Strength Indicator (RSSI) report, the terminal device applies to the reporting configuration the discovery signal measurement timing configuration included in the related measurement object, and performs RSSI measurement on the frequency indicated by the measurement object.

The terminal device according to the embodiments of the present invention performs the RSSI measurement on the frequency indicated by the measurement object in a measurement duration based on the discovery signal measurement timing configuration.

When the terminal device according to the embodiments of the present invention supports Cell-specific reference signals (CRS)-based discovery signal measurement, the terminal device applies the discovery signal measurement timing configuration, and performs CRS measurement on the secondary cell in the measurement duration based on the discovery signal measurement timing configuration.

The terminal device according to the embodiments of the present invention performs one of measurement related to a first RSSI report and measurement related to a second RSSI report or both of the measurements based on the reporting configuration in the measurement duration based on the discovery signal measurement timing configuration.

The base station device according to the embodiments of the present invention configures a primary cell and one or more secondary cells to the terminal device. The base station device indicates a measurement object including a discovery signal measurement timing configuration indicating a transmission timing of a discovery signal, the reporting configuration including information related to a Received Signal Strength Indicator (RSSI) report, and a measurement identity for linking the reporting configuration and the measurement object, to the terminal device. Thus, the base station device causes the terminal device to perform the RSSI measurement on the frequency indicated by the measurement object in a measurement duration based on the discovery signal measurement timing configuration.

The base station device according to the embodiments of the present invention causes to perform one of measurement related to the first RSSI report and measurement related to the second RSSI report or both of the measurements based on the reporting configuration in the measurement duration based on the discovery signal measurement timing configuration.

In a communication system according to the embodiments of the present invention, the base station device configures a primary cell and one or more secondary cells to the terminal device, and indicates a measurement object including a discovery signal measurement timing configuration indicating a transmission timing of a discovery signal, a reporting configuration including information related to a Received Signal Strength Indicator (RSSI) report, and a measurement identity for linking the reporting configuration and the measurement object, to the terminal device. When the discovery signal measurement timing configuration is included in the measurement object associated with a frequency of the secondary cell in a deactivated state, the terminal device applies the discovery signal measurement timing configuration related to measurement of Reference Signal Received Power (RSRP) and Reference Signal Received Quality (RSRQ) of the secondary cell in the deactivated state. When, in each configured measurement identity, the associated reporting configuration includes information related to an RSSI report, the terminal device applies to the reporting configuration the discovery signal measurement timing configuration included in the associated measurement object, and performs RSSI measurement at the frequency indicated by the measurement object.

A measurement method of the terminal device according to the embodiments of the present invention includes at least the steps of: configuring a primary cell and one or more secondary cells; when the discovery signal measurement timing configuration indicating the transmission timing of the discovery signal is included in a measurement object associated with the frequency of the secondary cell in the deactivated state, applying the discovery signal measurement timing configuration to measurement of Reference Signal Received Power (RSRP) and Reference Signal Received Quality (RSRQ) of the secondary cell in the deactivated state; when, in each configured measurement identity, the associated reporting configuration includes information related to a Received Signal Strength Indicator (RSSI) report, applying to the reporting configuration the discovery signal measurement timing configuration included in the associated measurement object; and performing the RSSI measurement on the frequency indicated by the measurement object.

The measurement method of the terminal device according to the embodiments of the present invention further includes the step of performing the RSSI measurement on the frequency indicated by the measurement object in the measurement duration based on the discovery signal measurement timing configuration.

The measurement method of the terminal device according to the embodiments of the present invention includes the steps of: when the terminal device supports the Cell-specific reference signals (CRS)-based discovery signal measurement, applying the discovery signal measurement timing configuration; and performing the CRS measurement on the secondary cell in the measurement duration based on the discovery signal measurement timing configuration.

The measurement method of the terminal device according to the embodiments of the present invention includes the step of performing one of measurement related to the first RSSI report and measurement related to the second RSSI report or both of the measurements based on the reporting configuration in the measurement duration based on the discovery signal measurement timing configuration.

A measurement method of a base station device according to the embodiments of the present invention includes the steps of: configuring a primary cell and one or more secondary cells to a terminal device; and indicating a measurement object including a discovery signal measurement timing configuration indicating a transmission timing of a discovery signal, the reporting configuration including information related to a Received Signal Strength Indicator (RSSI) report, and a measurement identity for linking the reporting configuration and the measurement object, to the terminal device to cause the terminal device to perform an RSSI measurement on the frequency indicated by the measurement object in a measurement duration based on the discovery signal measurement timing configuration.

The measurement method of the base station device according to the embodiments of the present invention causes the terminal device to perform one of measurement related to the first RSSI report and measurement related to the second RSSI report or both of the measurements based on the reporting configuration in the measurement duration based on the discovery signal measurement timing configuration.

An integrated circuit mounted on a terminal device according to the embodiments of the present invention causes the terminal device exhibit at least the functions of: configuring a primary cell and one or more secondary cells; when a discovery signal measurement timing configuration indicating a transmission timing of a discovery signal is included in a measurement object associated with a frequency of a secondary cell in a deactivated state, applying the discovery signal measurement timing configuration to measurement of Reference Signal Received Power (RSRP) and Reference Signal Received Quality (RSRQ) of the secondary cell in the deactivated state; when, in each configured measurement identity, the associated reporting configuration includes information related to the received signal strength indicator (RSSI) report, applying to the reporting configuration the discovery signal measurement timing configuration included in the associated measurement object; and performing RSSI measurement on the frequency indicated by the measurement object.

An integrated circuit mounted on a base station device according to the embodiments of the present invention causes the base station device to exhibit at least the functions of: configuring a primary cell and one or more secondary cells to a terminal device; and indicating a measurement object including a discovery signal measurement timing configuration indicating a transmission timing of a discovery signal, the reporting configuration including information associated with the Received Signal Strength Indicator (RSSI) report, and a measurement identity for linking the reporting configuration and the measurement object, to the terminal device to cause the terminal device to perform the RSSI measurement on a frequency indicated by the measurement object in a measurement duration based on the discovery signal measurement timing configuration.

INDUSTRIAL APPLICABILITY

The embodiments of the present invention are applicable to at least mobile phones, personal computers, tablet computers, or the like.

REFERENCE SIGNS LIST

1 Terminal device
2, 2-1, 2-2 Base station device
101, 201 Reception unit
102, 202 Demodulation unit
103, 203 Decoding unit
104, 204 Reception data control unit
105, 205 Physical layer control unit
106, 206 Transmission data control unit
107, 207 Coding unit
108, 208 Modulation unit
109, 209 Transmission unit
110, 210 Radio resource control unit
211 Network signal transmission/reception unit
R01, R02 Receive antenna unit
T01, T02 Transmit antenna unit

The invention claimed is:

1. A terminal device configured to:
configure a primary cell and one or more secondary cells, and
in a case where, with respect to each configured measurement identity, a reporting configuration, which is associated with the each configured measurement identity, includes information indicating a threshold associated with a Received Signal Strength Indicator (RSSI) report and a report interval, periodically report, as a measurement result, (i) an average value of RSSIs measured in a duration of the report interval and (ii) a percentage of the RSSIs being beyond the threshold.

2. A base station device configured to:
configure a primary cell and one or more secondary cells to a terminal device; and
indicate (i) a measurement object, (ii) a reporting configuration including information indicating a threshold associated with a Received Signal Strength Indicator (RSSI) report and a report interval, and (iii) a measurement identity for linking the reporting configuration and the measurement object, to the terminal device to cause the terminal device to periodically report, as a measurement result, (i) an average value of RSSIs of a frequency indicated by the measurement object in a duration of the report interval and (ii) a percentage of the RSSIs being beyond the threshold.

3. A measurement method of a terminal device comprising at least the steps of:
configuring a primary cell and one or more secondary cells; and
in a case where, with respect to each configured measurement identity, a reporting configuration, which is associated with the each configured measurement identity, includes information indicating a threshold associated with a Received Signal Strength Indicator (RSSI) report and a report interval, periodically reporting, as a measurement result, (i) an average value of RSSIs measured in a duration of the report interval and (ii) a percentage of the RSSIs being beyond the threshold.

4. A measurement method of a base station device comprising the steps of:
configuring a primary cell and one or more secondary cells to a terminal device; and
indicating (i) a measurement object, (ii) a reporting configuration including information indicating a threshold associated with a Received Signal Strength Indicator (RSSI) report and a report interval, and (iii) a measurement identity for linking the reporting configuration and the measurement object to the terminal device, to cause the terminal device to periodically report, as a measurement result, (i) an average value of RSSIs of a frequency indicated by the measurement object in a duration of the report interval and (ii) a percentage of the RSSIs being beyond the threshold.

5. An integrated circuit mounted on a terminal device, wherein the integrated circuit causes the terminal device to exhibit at least the functions of:
configuring a primary cell and one or more secondary cells; and
in a case where, with respect to each set measurement identity, a reporting configuration, which is associated with the each configured measurement identity, includes information indicating a threshold associated with a Received Signal Strength Indicator (RSSI) report and a report interval, periodically reporting, as a measurement result, (i) an average value of RSSIs measured in a duration of the report interval and (ii) a percentage of the RSSIs being beyond the threshold.

6. An integrated circuit mounted on a base station device, wherein the integrated circuit causes the base station device to exhibit at least the functions of:
configuring a primary cell and one or more secondary cells to a terminal device; and
indicating (i) a measurement object, (ii) a reporting configuration including information indicating a threshold associated with a Received Signal Strength Indicator (RSSI) report and a report interval, and (iii) a measurement identity for linking the reporting configuration and the measurement object to the terminal device, to cause the terminal device periodically report, as a measurement result, (i) an average value of RSSIs of a frequency indicated by the measurement object in a duration of the report interval and (ii) a percentage of the RSSIs being beyond the threshold.

* * * * *